United States Patent [19]
Sutton et al.

[11] Patent Number: 5,790,434
[45] Date of Patent: Aug. 4, 1998

[54] HYBRID METHOD OF CHARACTERIZING SPATIAL ASPECTS OF THE TRANSECT OF A RIVER HAVING PREDETERMINED WATER SURFACE LEVELS

[75] Inventors: Virginia Kay Sutton, Waco, Tex.; John M. Nestler, Vicksburg, Miss.

[73] Assignee: The United States of America as represented by the Secretary of the Army, Washington, D.C.

[21] Appl. No.: 493,026

[22] Filed: Aug. 31, 1995

[51] Int. Cl.$^6$ ............................................. G01B 21/20
[52] U.S. Cl. ............................................. 364/578
[58] Field of Search .......................... 73/170.01, 295; 33/281, 282, 285; 364/578; 395/500

[56] References Cited

U.S. PATENT DOCUMENTS 5,197,039  3/1993  Corcoran et al. .................. 367/52
5,307,292  4/1994  Brown et al. ..................... 364/564

OTHER PUBLICATIONS

Internet address http://nhsbig.inhs.uiuc.edu/density_estimation/TRANSECT.README 1994.

Primary Examiner—Kevin J. Teska
Assistant Examiner—N. L. Dehlitsch-Moats
Attorney, Agent, or Firm—Luther A. Marsh

[57] ABSTRACT

Profiles of a river area analyzed by determining a ruler length characterizing the size of topological features of the river. The perimeter of a transect of the river is then determined by integrating the Pythagorean theorem using selected points on the transect. Main voids occurring in the calculation are measured by dividing the main void into triangular areas and accumulating the triangular areas across the main void.

6 Claims, 25 Drawing Sheets

$L(\delta) = a\delta^{1-D}$
$D = 1.52 \pm 0.01$

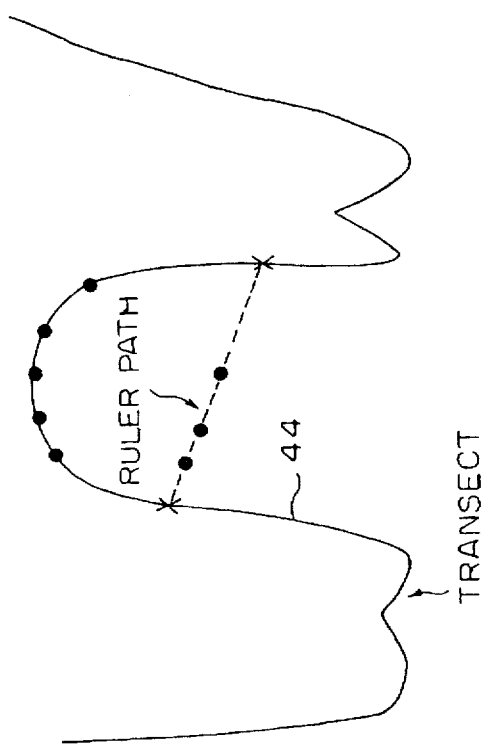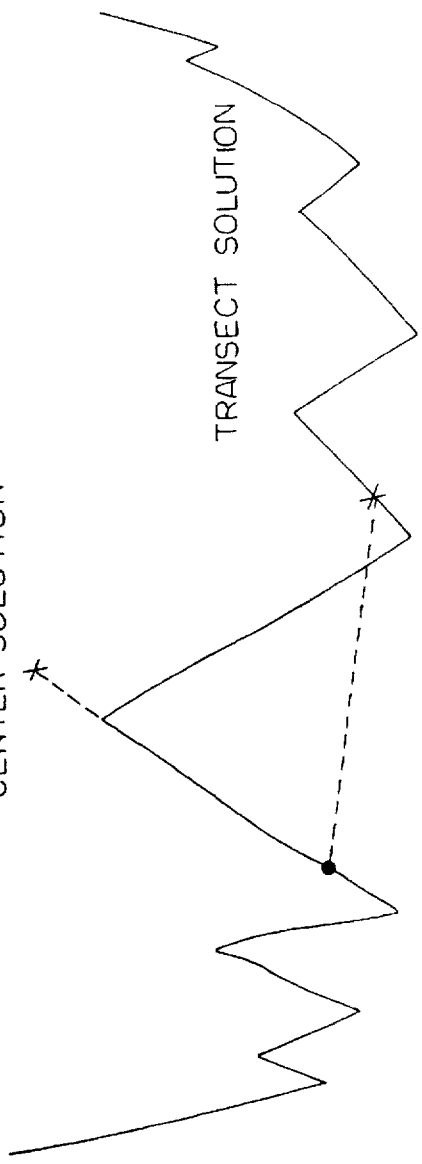
FIG. 7
FIG. 8

F I G. 11
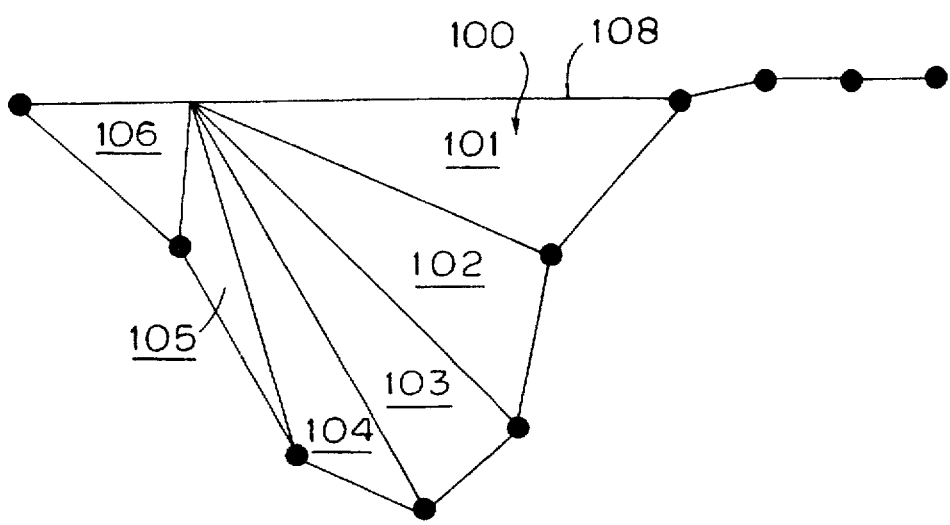

HYBRID METHOD OF CHARACTERIZING SPATIAL ASPECTS OF THE TRANSECT OF A RIVER HAVING PREDETERMINED WATER SURFACE LEVELS

GOVERNMENT RIGHTS

The invention described herein may be manufactured and used by or for the Government of the United States of America for governmental purposes without the payment of any royalties.

FIELD OF THE INVENTION

The present invention relates to analyzing liquid flow. More particularly, the present invention relates to analyzing flow characteristics of rivers.

BACKGROUND OF THE INVENTION

A software package quantifies the fractal properties of bounded irregular curves. This system is used for environmental and hydraulic studies and is used for river cross-sections, or transects. Development of the program has been from the perspective of hydraulic applications and is appropriate for analyzing river profiles at a specific discharge level and, therefore, is used for steady state rather than dynamic studies. The current approach in analyzing rivers involves breaking transects into smaller sections called elements or cells.

A river cross section extends transversely across flow lines from one river bank to another and the cells are divided by vertical lines from the water surface to the bottom of the river. Professional experience is relied on to determine location of these cell dividers. For any riverine analysis, there is a particular characteristic or characteristics of interest that can be described by a known mathematical formula, usually a partial differential equation. These equations are typically impossible to solve analytically, hence an approximate solution using a series, such as Fourier Series, is found in each cell. To generate this series approximation, an initial value for the characteristics of interest, such as water velocity, sediment transport or chemical concentration, is assigned to each cell. Then this element information is input to a finite element code to generate the approximate solution to the equation.

The problem with the approach described above, is that the discretization of transects into cells completely ignores the role that patterns of shape within the cross section play in hydraulic action. As is stated in Milne, in *Quantitative Methods in Landscape Ecology: The Analysis and Interpretation of Landscape Heterogeneity*, "landscape structure affects the spread and disturbance and regulates the movements of resources, organisms and energy." Patterns of hydraulic motion such as eddies result from projections in the water. Thus, hydraulic flow is affected by the shape through which the media must move. The patterns and intricacies of river bottoms are not recognized or quantified as an important river characteristic in the discretization method.

SUMMARY OF THE INVENTION

The present invention is directed to a method of analyzing profiles of a river at predetermined flow and water surface levels. The first step is determining the ruler sizes to use in measuring the river transect and characterizing the size of topological features, either according to the following equation:

$$RL = \text{integer } (2^{i+j/j})$$

wherein $1 \leq i \leq 10$, $0 \leq j \leq 2$, or can be specified by the user. Next, the perimeter of the transect is determined according to the equation $$P = \sum_{i=1}^{n_{points}-1} d_i$$

where $$d_i = \sqrt{(X_{i+1} - X_i)^2 + (Y_{i+1} - Y_i)^2}.$$

A starting point is then selected for measuring the perimeter and a line segment including the first starting point is selected. The center of a compass is placed on the first starting point and measured forward to the end of the transect and then measured backwards to the beginning of the curve. Possible intersections are eliminated by finding the sum of squared error. The intersection with the least sum of squared error is found and the variance for each ruler size is determined according to the formula:

$$\text{Variance} = \frac{\text{sum of squared error}}{n - 1}$$

where n is the number of data points along the curve between the starting point and solution.

In accordance with a further aspect of the invention, an area of a main void is calculated by dividing the main void into triangles and using the formula for the area of the triangle:

$$\text{area}_{triangle} = \frac{1}{2} * [X_1 Y_2 + X_2 * Y_3 + X_3 * Y_1 - Y_1, XY_2 - Y_2 * X_3 - Y_3 * X_1].$$

The areas for each horizontal position are saved and accumulated across the main void.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 7 is a plot illustrating calculation of SSE for ruler paths;

FIG. 8 is a plot comparing a center solution to a transect solution;

FIG. 11 is a diagrammatical view showing how a section of a river is triangulated.

DETAILED DESCRIPTION

Figure 1:
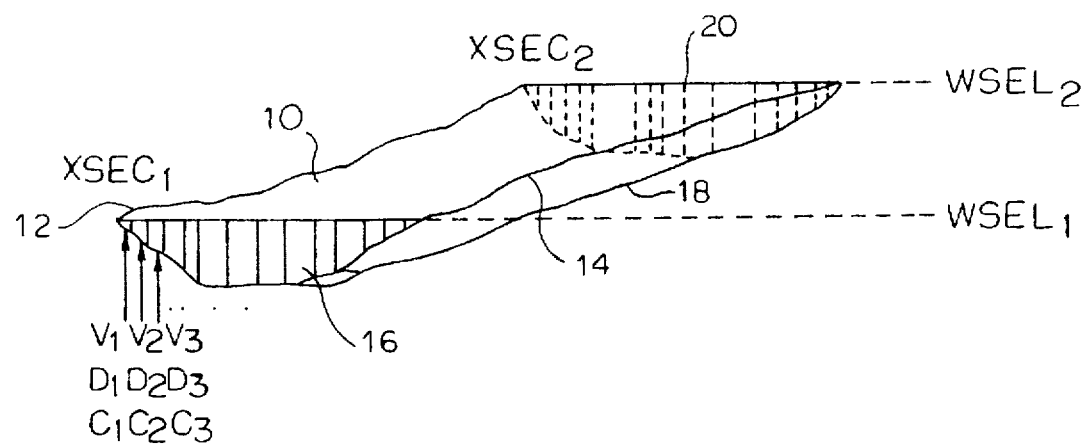
FIG. 1 is a schematic illustration of a river cross-section.

Referring now to FIG. 1, a portion of a river 10 disposed between opposed banks 12 and 14 is shown in cross-section. The river portion 10 is divided into cells 16 extending from the river bottom 18 to the river surface 20. For purposes of this discussion, there is a first cross-section $XSEC_1$ and first section elevation $WSEL_1$ and a second cross-section $XSEC_2$ and second section elevation $WSEL_2$. Each cell has the properties of velocity V, depth D and crossectional area C.

Figure 2:
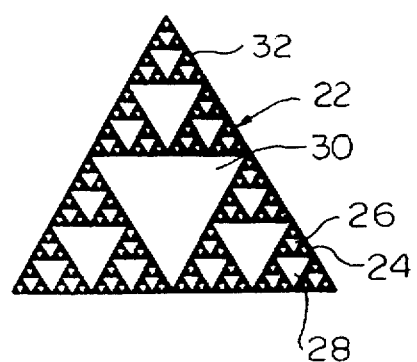
FIG. 2 is an illustration of Seirpinski's triangle.
Figure 3:
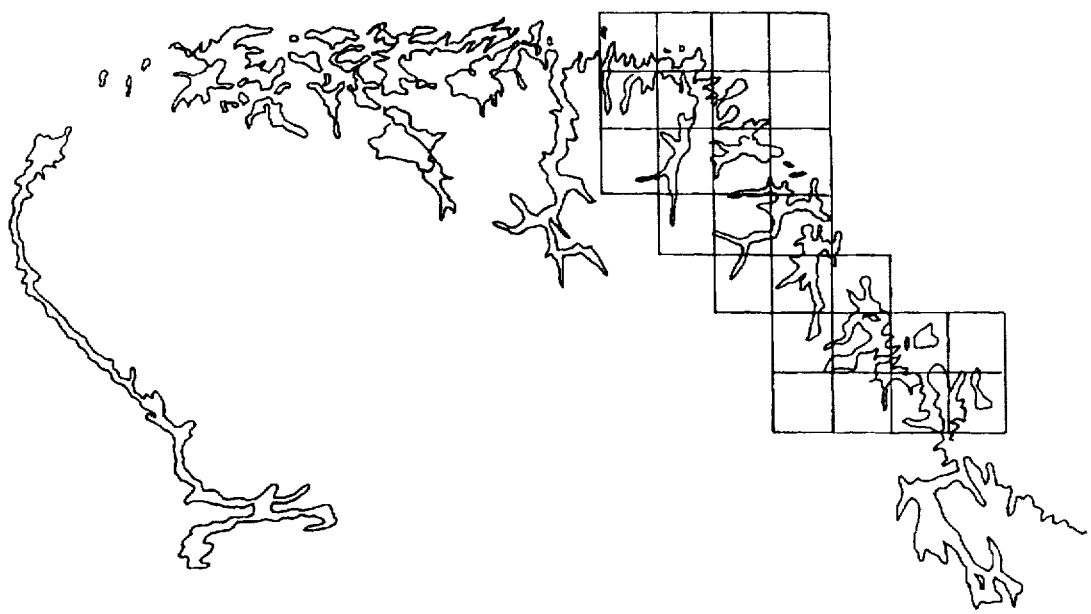
FIG. 3 is a view of a coast line.

Referring now to FIG. 2, in 1975, Mandelbrot introduced the concept of fractal geometry which provides new means for describing shape. A fractal object is one which looks the same at a variety of scales. As an example, Seirpinski's Triangle 22 of FIG. 2 is an exact or mathematical fractal because the generating pattern is exactly replicated at each scale. In other words, the smaller triangles 24, 26, 28 and 30 have the same shape as the large triangle 32.

Exact fractals are not found in nature, but many natural objects are statistical fractals. For example, consider a tree. Upon different levels of magnification, the same pattern of stem and branches appears, although it is not identical over all scales. A statistical fractal is an object with a fractal dimension D, which is greater than its topological dimension. Topology is the study of geometrical figures. So the topological dimension of an object is the dimension of the geometric figure that best models it. Since a sheet of paper has minimal thickness, it is well modeled by a plane, the topological dimension of the paper is two, since a sheet of paper is a two dimensional object.

Figure 4:
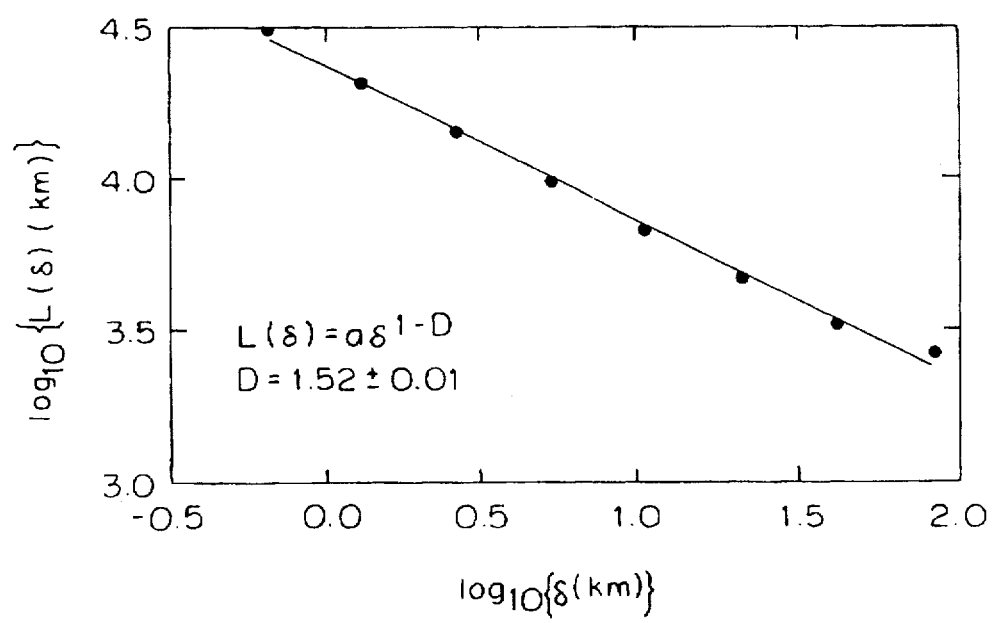
FIG. 4 is an M-R plot of the coast line of FIG. 3.

To determine whether a natural object is fractal, an M-R plot, such as the plot of FIG. 4, is used to determine the fractal dimension D and see if it is greater than the topological dimension of the object. The M-R plot is named for its developers, Mandelbrot and Richardson. Let $\delta$ represent the length characterizing the size of the topological features revealed on a map of a given coastline, and it is found that the length L depends on $\delta$ according to a relationship of the equation.

$$L(\delta) = \frac{const}{\delta^{D-1}} \qquad 1.$$

where const is a constant greater than unity (Goodings and Middleton, 1991). As $\delta$ decreases, the length L of the coastline increases. D, named the fractal dimension by Mandelbrot, has different values for different coastlines. In 1983, Mandelbrot plotted Richardson's L ($\delta$) and $\delta$ values for different coastlines, of Great Britain, on log-log paper. The negative slope of the best fit line containing these data points is the fractal dimension, D, as shown:

$$L(\delta) = \frac{const}{\delta^{D-1}} \rightarrow \log(L(\delta)) = (D-1)\log(const * \delta)$$
$$= (D-1)[\log(const) + \log(\delta)]$$
$$= (D-1)\log(\delta)$$
$$\rightarrow \frac{\log(L(\delta))}{\log(\delta)} = -(D-1)$$
$$\rightarrow \frac{-\log(L(\delta))}{\log(\delta)} = D-1$$
$$\rightarrow \frac{1 - \log(L(\delta))}{\log(\delta)} = D$$

2.

With respect to the coastline of Great Britain, Mandelbrot found D=1.25, hence he determined that this curve was fractal. Feder applied the same approach to the southern coast of Norway, and found its fractal dimension D to be 1.52 (see FIG. 4). This approach can be applied to other geographical figures as river stream channels, like islands, result from a number of non-random dimensional and depositional processes. Therefore, it seems reasonable that river models are fractal, as their shape results from processes that operate over a limited range of energies superimposed on previous surfaces. Within the patterns of shape in the channel is information about the processes that formed it, as well as how fluid will interact with it. The present invention was developed to quantify this pattern information which has significant application to hydraulic and environmental studies.

Other algorithms, such as FRACT (Kennedy and Lin, 1985) have described the fractal properties of curves by simply calculating a fractal dimension. Some researchers have found that the complexity of natural objects, rather than being described by a single number D, varies greatly with scale (Mark and Aronson, 1984; Lam and Quattrochi, 1992). Robert Andrle developed a means to identify scales associated with the object's greatest complexity, or characteristic scales. He conceptualized an algorithm called AMT, or Angle Measure Technique to identify this significant scale (Andrle, 1994). In this approach, an initial starting point, A, and an initial scale value, S, are chosen. The program chooses the starting points at random. From starting point A, the computer moves S distance in both directions along the curve. The supplementary angle to the angle between these three points is measured and the supplementary angle measure is saved with its corresponding distance S. For each scale S, AMT takes 500 angle measures and calculates the mean supplementary angle MA. MA is plotted against scale S. The peaks of these graphs indicate the characteristic scale, $S_c$, as well as the maximum degree of complexity at that scale, the maximum mean angle, $A_c$. While FRACT and AMT quantify a portion of the scale properties of irregular curves, they are incomplete in themselves. The present invention more fully describes the complexity of these curves by using a hybrid approach.

Figure 9:
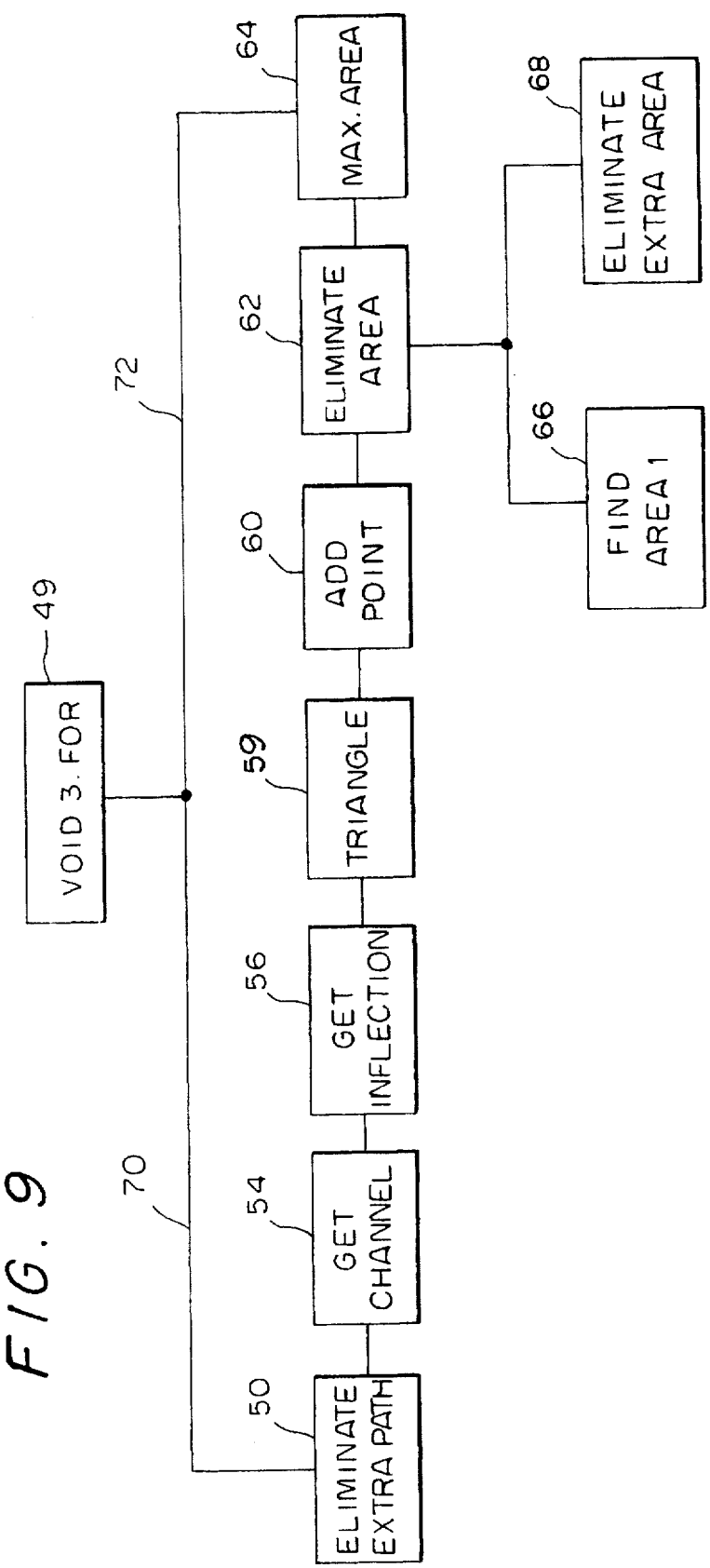
FIG. 9 is a calling tree diagram illustrating the structure of the VOID 3 program.

The software of the present invention is referred to in this text as 3 FORTRAN programs—Measure8 (FIG. 6) for, Plotfile.for, and Void3.for (FIG. 9). Measure 8 (FIG. 6), for does all the analysis and calculations on the original curve coordinate data. "Void3.for" analyses the paths each ruler makes across a transect to determine where maximum ruler area occurs at each scale. "Plotfile.for" creates an input set for plotting in SAS. Each of these modules create files which are imported into plotting programs such as GRAPHER, DISPLAA or SAS to generate graphs. For ease of understanding, the construction of "Measure8.for" and "Void3.for" is described as they would be applied to river cross sections, although this software is applicable to any two dimensional data for which a vertical upper bound is established.

Figure 5:
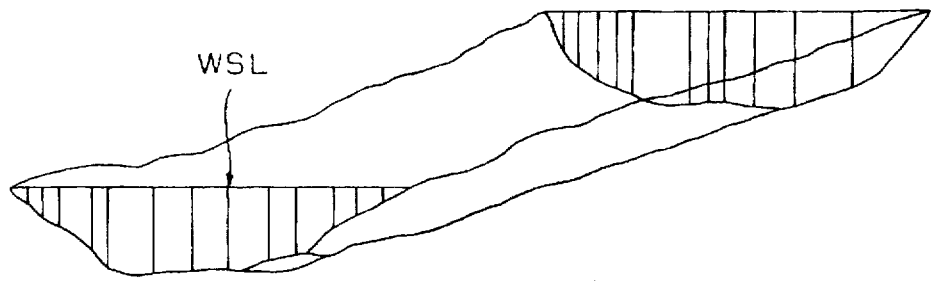
FIG. 5 is a perspective view of a river transect.
Figure 6:
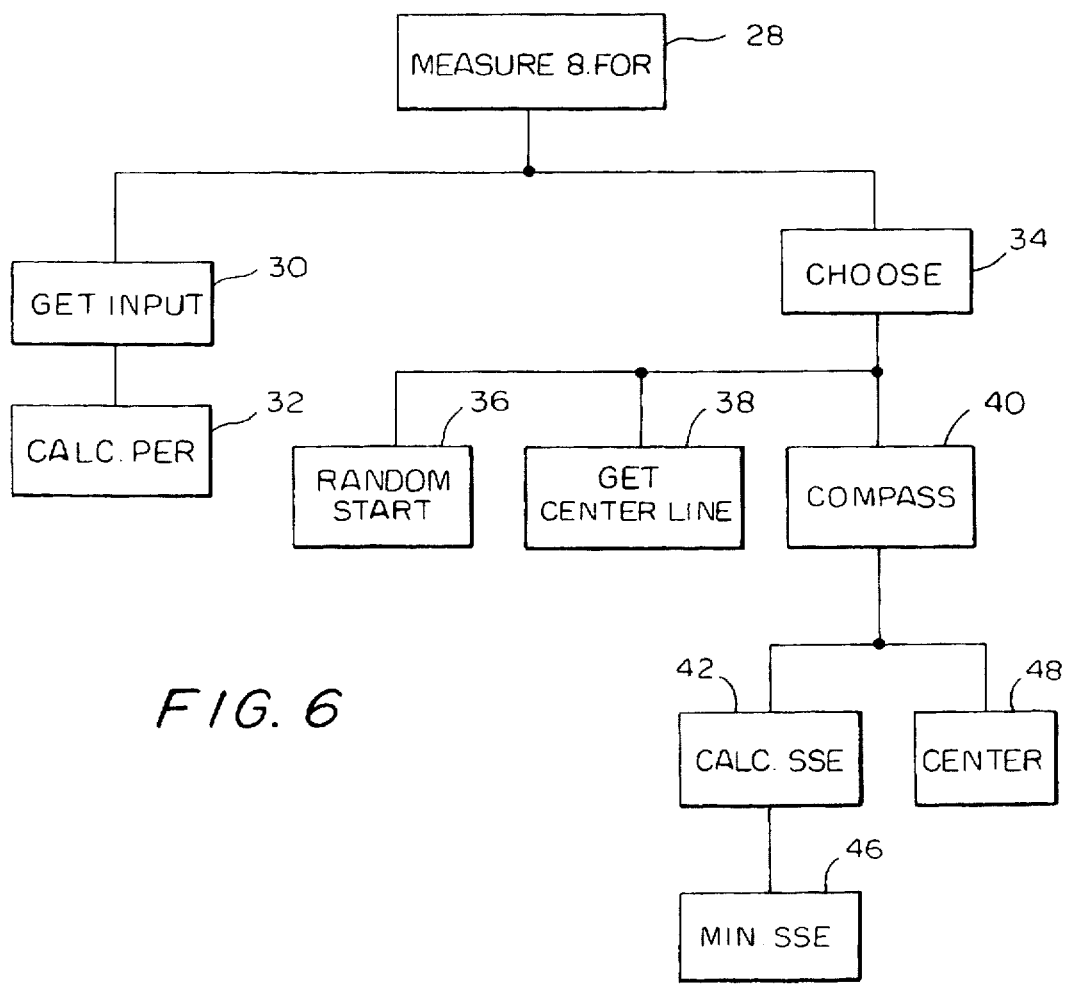
FIG. 6 is a calling tree diagram illustrating the structure of the MEASURE 8 program.

Referring again to FIG. 1, "Measure8.for" requires as input a set of two dimensional coordinates as well as an upper value in the vertical direction, WSL. In the particular application of a river cross section (10), WSL represents the highest wetted portion of the river transect (FIG. 5). "Measure8.for" consists of 9 subroutines and 2 functions. FIG. 6 delineates the structure of this module. This main program 28 first calls Subroutine Get_Input 30 to read in the user-supplied data. The user has the option to let the computer choose the ruler sizes with which to measure the transect. It does so using the following algorithm:

$$ruler = integer\ (2^{i+\frac{1}{2}*j})\qquad \text{Equation 3}$$

where $1 \leq i \leq 10,\ 0 \leq j \leq 2$ and integer indicates that the value in parentheses is truncated to become an integer value. Measure8.for also calculates the perimeter with rulers having non-integer length, but to eliminate confusion and unnecessary round-off error, rulers having lengths of integer value are utilized. The user also has the option to tell the program which points to use as starting points in the measuring process, or to let the program select via a random number generator. Get_input 30 reads in the coordinate data and calls Calc_Per 32 which calculates the actual perimeter of the transect by the following formula:

$$P = \sum_{i=1}^{n \text{ points}-1} d_i \quad \quad \text{Equation 4.}$$

where $$d_i = \sqrt{(X_{i+1}+X_i)^2 + (Y_{i+1}-Y_i)^2}.$$

That is, $d_i$ represents the Pythagorean distance between the i and i+1 data points. Then the main program calls Choose 34 which is the driver for all the measuring processes. If indicated by user, Choose calls Random_Start 36 which selects random starting points for measuring. Then Choose 34 calls Get_Center_Line 38 which determines the line segment that the starting point is on. Next Choose 34 calls Compass 40 which actually finds the best path for each ruler across the transect based on minimum variance. In measuring the transect, the center of the compass is placed on the first starting point. Then the program measures forward from the starting point. When it reaches the right end of the transect, it returns to the original starting point to measure backwards to the beginning of the curve. The program of the present invention orders the points from left to right, so the leftmost point is the beginning of the curve. Each increment that the ruler moves along the transect is chosen from all possible intersections that a circle of radius=r would make within the parameters of the curve. The first elimination of possible intersections comes from Calc_SSE 42.

Referring now to FIG. 6, Calc_SSE finds the sum of squared error, SSE, associated with each intersection of a circle with radius r with a line segment of the transect 44 SSE is defined to be the sum of squared vertical difference between the proposed ruler path and the transect 44. After SSE has been found and saved for every possible intersection, Calc_SSE calls Min_SSE 46 to find the intersection with the least SSE. This candidate for the solution must still be compared to the best center solution. A center solution is one which does not actually intersect the curve 44 but has y coordinate between the curve's minimum y value and WSL (FIG. 8). Subroutine Compass 40 calls Center 48 to get the center solution having the least SSE. This solution is compared with the best from Min_SSE 46, and the solution with the lesser SSE is chosen to be the new starting point from which the compass will continue to traverse the curve. Measure8 then returns to the main program to print out important values such as Perimeter, SSE and variance which are accumulated for each ruler size and are used for plotting input. Variance is given by the following formula:

$$\text{Variance} = \frac{SSE}{n-1} \quad \quad \text{Equation 5.}$$

In Equation 5, n is the number of data points along the curve 44 (FIG. 7) between starting point and corresponding solution. "Measure8.for" can be applied to multiple transects. "Void3.for" 49 (FIG. 9) builds on Measure8's analysis of the curve 44 by calculating the area associated with each ruler's path across the transect.

Figure 10:
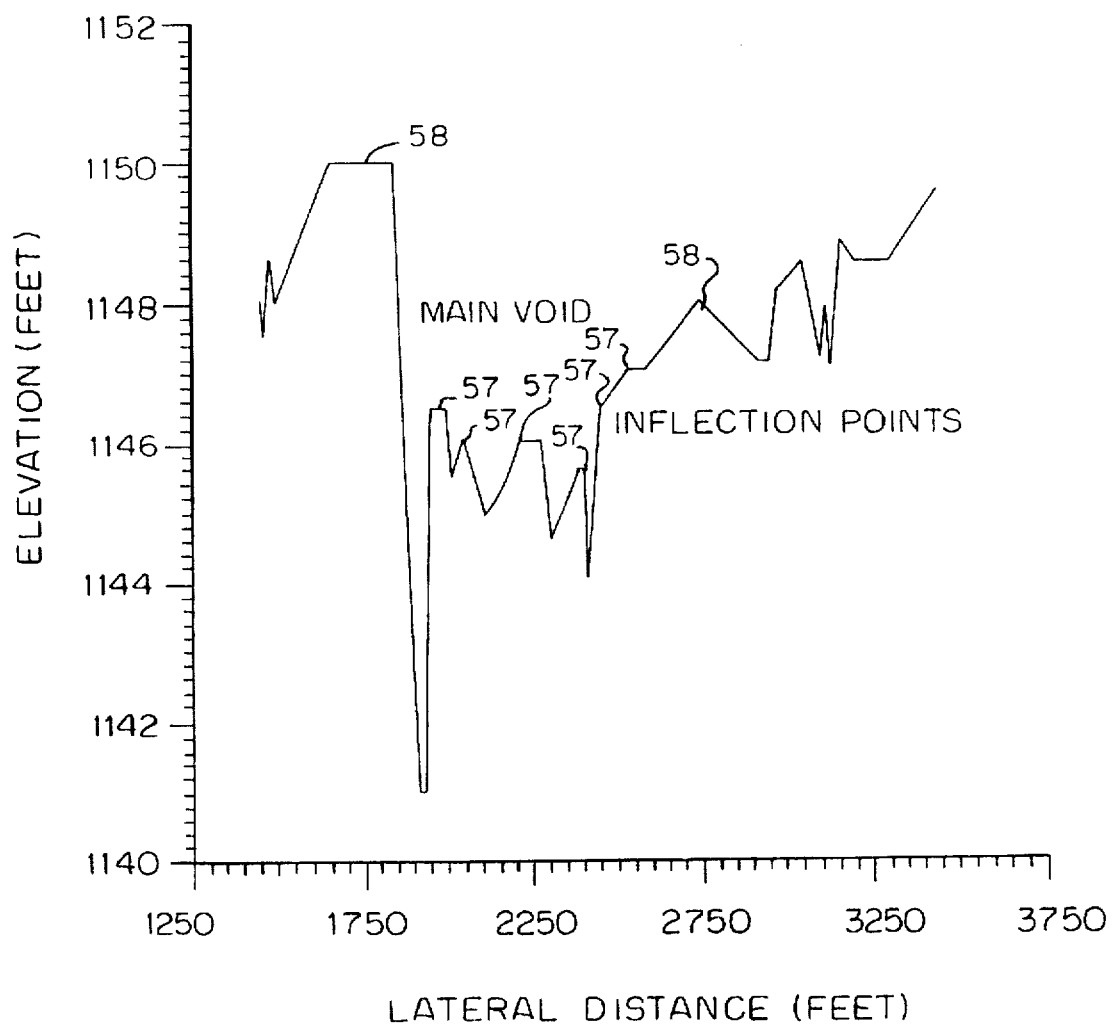
FIG. 10 is a plot of main voids and inflection points plotted as functions of elevation and lateral distance.

Referring now to FIG. 9, "Void3.for" consists of 9 subroutines and 2 functions. The subroutines are ELIMINATE_EXTRA PATH 50, GET_CHANNEL 52, GET_INFLECTION 54, TRIANGLE 58, ADDPOINT 60, ELIMINATE_AREA 62, MAX_AREA 64, FIND_AREA 1 60, and ELIMINATE_EXTRA_AREA 68. The flowchart of FIG. 9 shows program structure. Input to "Void3.for" 49 consists of two files, Path.inp 70 and Transect.var. 72 Path.Inp, an output file from Measure8.for, contains the path that each ruler takes across the transect 44. Transect.var 72 contains the total variance associated with each ruler path. The main program, MAIN, reads in coordinates of ruler paths from Path.inp 70, then calls ELIMINATE_EXTRA_PATH 50 to delete any duplicate points for each ruler path. Then MAIN performs a set of commands for each ruler path. First it calls GET_CHANNEL 54 to determine the beginning and end of main voids in the ruler path. Next GET-INFLECTION 56 finds the inflection points 57 within the main voids 58 (FIG. 10). TRIANGLE 59 calculates the area of the main voids 58 by dividing it into triangles (as in FIG. 11) and using the general formula for the area of the triangle:

$$AREA_{Triangle} = \tfrac{1}{2} * [X_1*Y_2+X_2*Y_3+X_3*Y_1-Y_1*X_2-Y_2*X_3-Y_3*X_1]. \quad \text{Equation 6}$$

These areas are saved for each horizontal position and also accumulated across the main void. Once area values are saved with horizontal position in the transect, ADD_POINT 60 interpolates between points in this curve to make them more equidistant. ELIMINATE_AREA 62 is called by MAIN to verify the authenticity of the area values at each horizontal position for each ruler. If a large ruler shows greater area at a given horizontal position than that of a smaller ruler, this is an artifact of the larger ruler's attempt to fit, so the larger ruler's area is reset to that of the smaller ruler size. ELIMINATE_AREA 62 performs ELIMINATE_EXTRA_AREA 68. FIND_AREA 1 66 calculates area at a fixed horizontal position for the smaller ruler to compare with that of the larger ruler.

ELIMINATE_EXTRA_AREA 68 deletes any duplicate points that might come into the area curve in the authenticating process. MAIN then calls MAX_AREA 64 which creates all the plotfiles to be used by graphics packages to produce plots. MAX_AREA 64 reads in transect.var 72 in order to create the three dimensional plotfile Max-Area by Variance by Ruler. Other plotfiles are Mean-Area by Ruler and Max-Area by Ruler. Void3.for 49 performs a significant role in quantifying area of the transect by the scale.

The software of FIGS. 12-31 provides numerous advantages over previous approaches to quantifying scale properties of natural objects. Its chief benefit is that it uses several methods to numerically and graphically represent this quality in irregular curves. It is superior to the discretization process which does not even consider the fractal properties of the river cross section in its analysis. It is more useful than algorithms such as FRACT which simply find the fractal dimension of an irregular curve because it quantifies the transect at a variety of scales in addition to calculating the fractal dimension.

The present invention also improves on the measuring algorithm used in FRACT because it incorporates the statistical concept of sum of squared error in choosing the best intersection. This is a novel approach to measuring. Kennedy and Lin determined in their development of FRACT that perimeter, and thus fractal dimension, is dependent upon starting position. In spite of this, FRACT uses only the first or last data point as starting position. So their results are biased by choice of starting point. THE present invention is an improvement to FRACT because it calculates perimeter and fractal dimension by measuring from multiple randomly chosen starting points. MEASURE also goes beyond a single number, such as the fractal dimension by creating many types of graphs to identify the effect of scale in the viewing of the curve 44. Such graphs include ones which show where portions of the transect fail to exist at certain scales, where area is lost at particular scales, and how variance grows with scale. Hence, the present invention is more useful than Andrle's angle measuring algorithm which simply identifies a characteristic scale without showing why this scale is significant. In addition, the present invention is more suitable for actual field data then either FRACT or AMT.

The present invention is more applicable to river transects than either FRACT or AMT. In studying river transects, whether flow, sediment transport or chemical concentration is being examined, the amount of discharge, or Q is a significant factor. Over time Q varies greatly, and this alters the shape of the basin and the significant scales for the channel, and thus also the fractal dimension. The present invention is appropriate for analyzing profiles at a predetermined Q, but it can analyze the profile at different water surface levels. At each change in WSL, the amount of wetted perimeter changes. This also determines the dominant scales and patterns in the profile. Neither FRACT nor AMT have a means of adjusting for specific WSL values as the present invention. Since the present invention does this, it is more appropriate for actual field data than either FRACT or AMT.

Referring now to FIGS. 11–31 triangularization of the river is shown (FIG. 11) and subroutines for the software of the present invention are depicted in flow charts of FIGS. 12–31.

Figure 12:
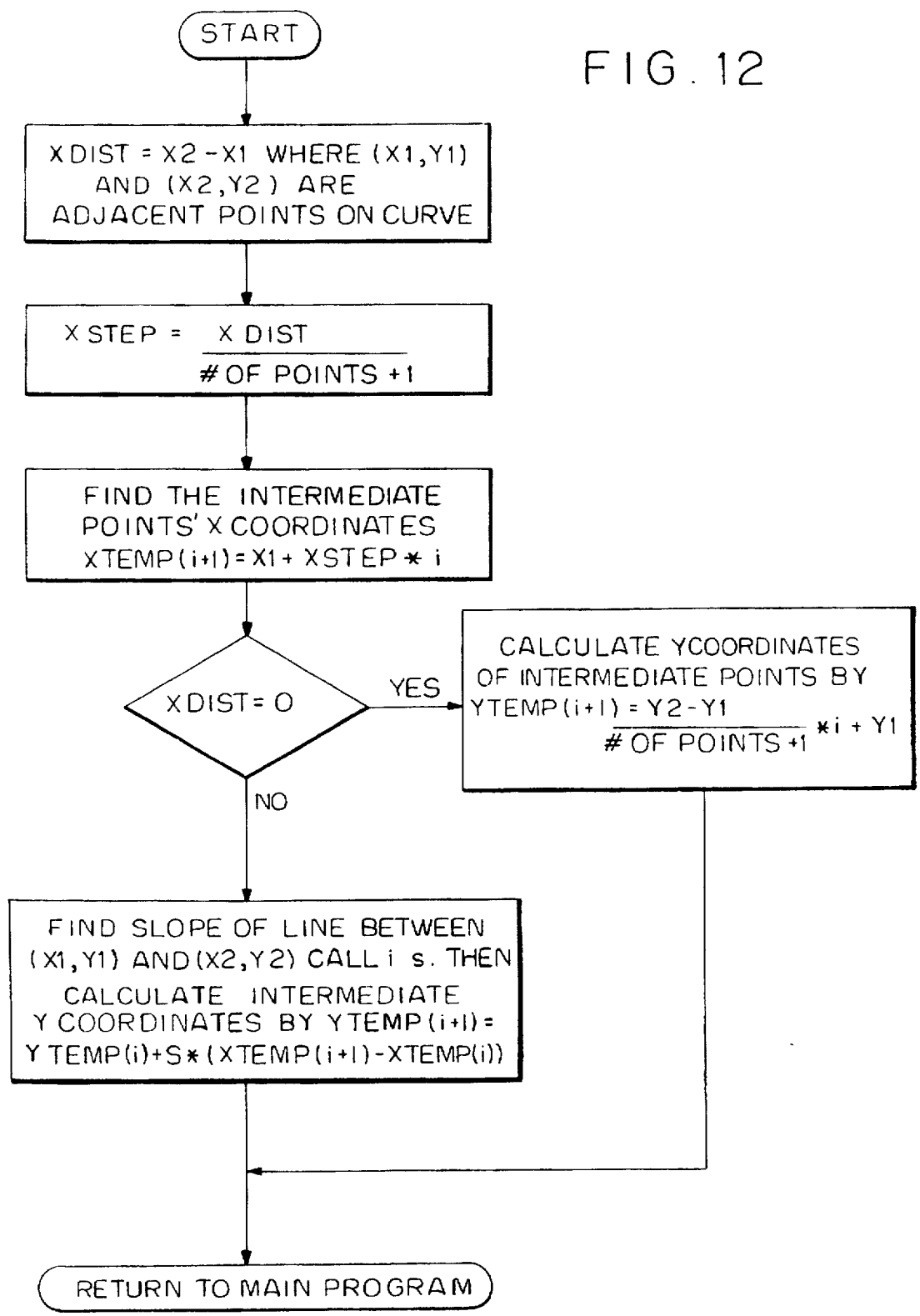
FIGS. 12–31 are flow charts of subroutines for the software utilized in practicing the present invention.

FIG. 12—Subroutine Add_Point

MAIN gives ADD_POINT a pair of points to interpolate between, and the number of points desired between these two points, P1 and P2.

ADD_POINT calculates the x distance between each new interpolated point, xstep, by $$xstep = \frac{X2 - X1}{numberofpoints + 1}$$

Then the x coordinates of the interpolated points will simply be the first x coordinate value plus an integer multiple of xstep. To find ystep, first determine whether P1 and P2 make up a vertical portion of the transect. If so, then xstep=0, and let $$ystep = \frac{Y2 - Y1}{numberofpoints + 1}$$

Then the y coordinates of all points between P1 and P2 will have y coordinates equal to Y1 plus an integer multiple of ystsep. If not a vertical portion of the transect, then xstep ≠ 0, and ADD_POINT will use the equation of line to solve for the y coordinate of each intermediate point by the following equation:

$$ytemp(i+1) = ytemp(i) + s*(xtemp(i+1) - xtemp(i))$$

where xtemp and ytemp are the arrays holding the x and y coordinates for the interpolated points, and S is the slope between P1 and P2. Once the coordinates for the intermediate points have been computed, ADD_POINT returns to MAIN.

Figure 13:
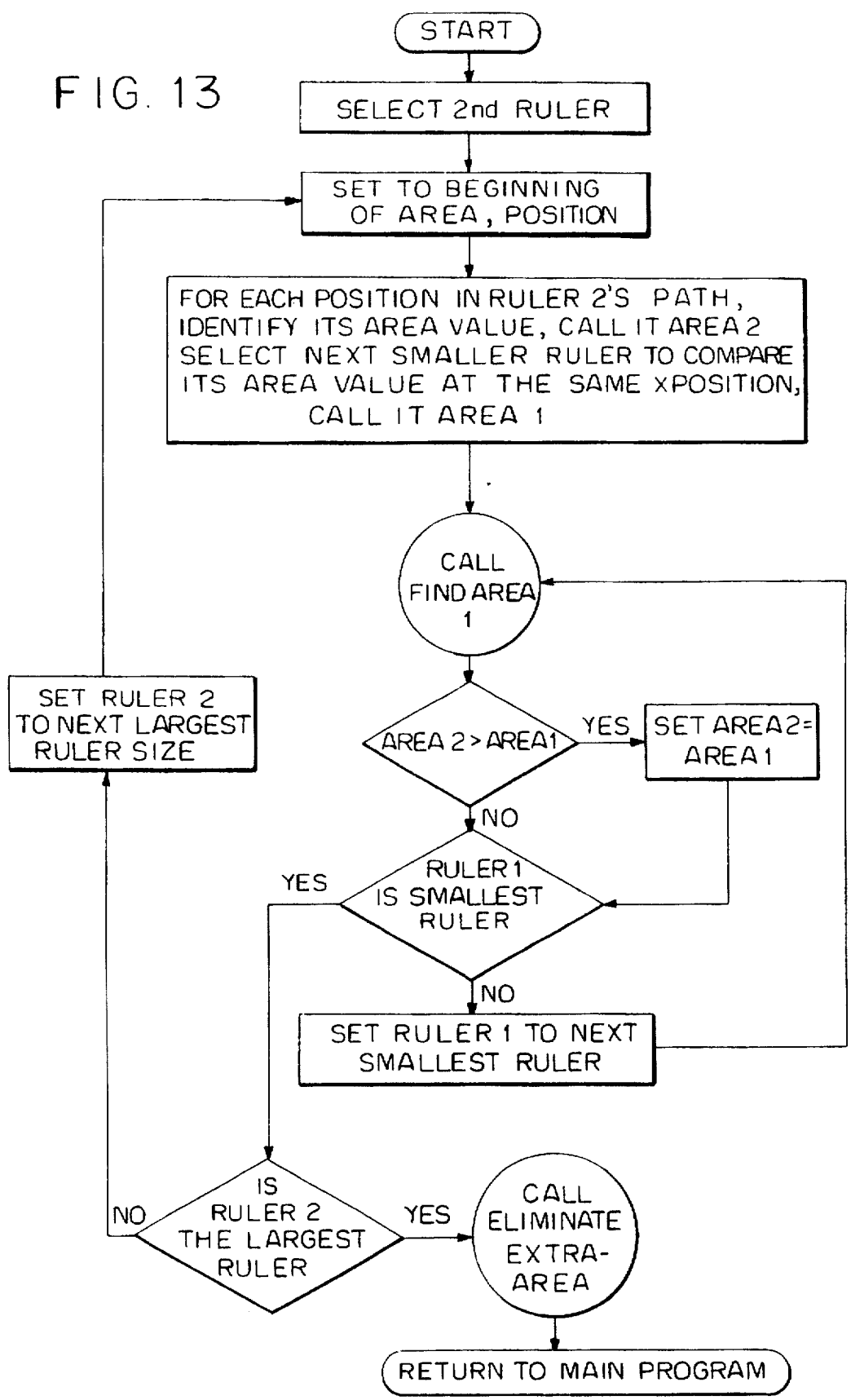

FIG. 13—Subroutine Eliminate_Area

ELIMINATE_AREA compares the area of the paths of different rulers by looping through all the possible ruler sizes in decreasing order from greatest to least. At first, let Ruler1 and Ruler2 represent two consecutive ruler sizes such that Ruler2 is the second smallest ruler and Rule 2>Ruler1. Identify the area of the path of Ruler2 at the first point in the path curve from the Area array; ELIMINATE_AREA calls FIND_AREA1 to compute the area of the path of Ruler1 at the same point. Test whether the area for Ruler1 or Ruler2 is greater. If the area for the path of Ruler2 is greater than that for Ruler1, then set the area for Ruler2 equal to the area for Ruler1. If not, then leaver the area value for Ruler2 as it is. Next check to see if Ruler1 is the smallest ruler size. If not, then repeat the process, setting Ruler1=the next smaller ruler from old Ruler1. Once Ruler1 has been set of the smallest ruler size, then check if Ruler2 is the largest ruler. If not, then repeat the process, setting Ruler2 to the next larger ruler size. After comparing with Ruler2 equal to the largest ruler size, call ELIMINATE_EXTRA_AREA and return to MAIN. Thus each ruler path is being compared to all the smaller rulers' paths at each position.

Figure 14:
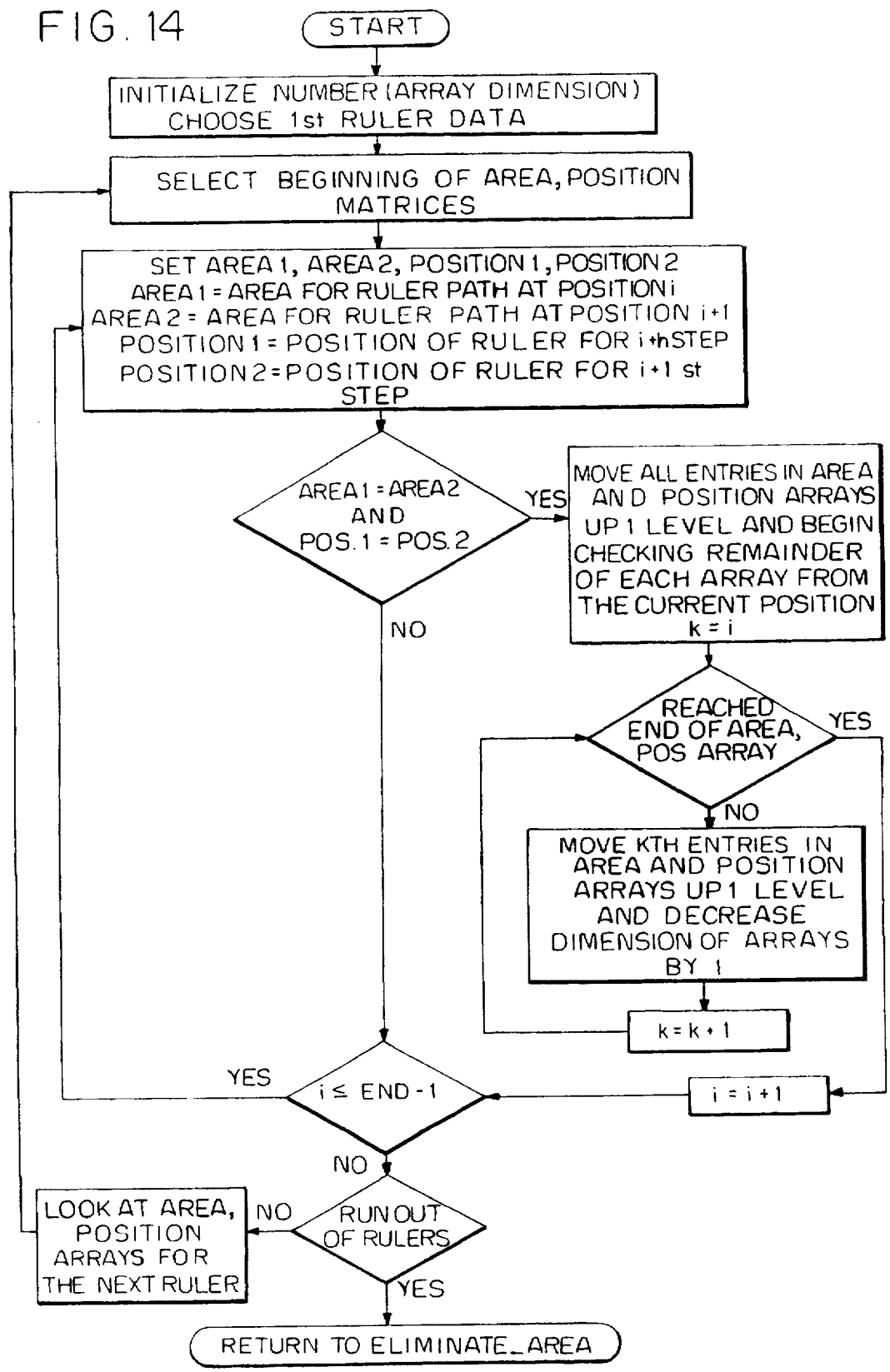

FIG. 14—Subroutine Eliminate_Extra_Area

ELIMINATE_EXTRA calls ELIMINATE_EXTRA_AREA to loop through the area and position arrays to eliminate any duplicate points that may have been generated, as well as appropriately decrease the count of points in these arrays. ELIMINATE_EXTRA_AREA does this for all ruler sizes, since the area and position arrays are indexed by the number of ruler sizes. After eliminating duplicate points, ELIMINATE_EXTRA_AREA returns to ELIMINATE_AREA (FIG. 13).

Figure 15:
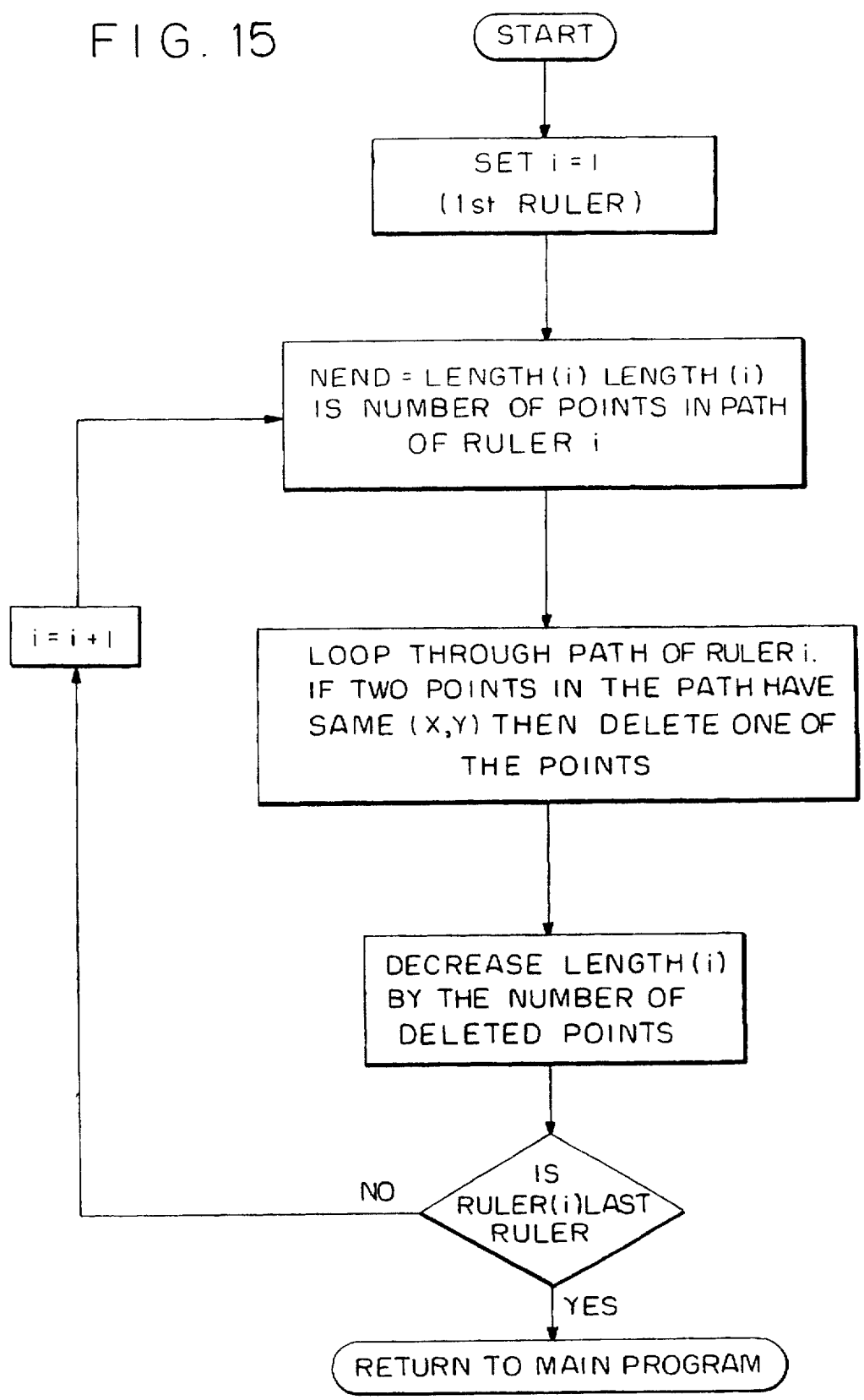

FIG. 15—Subroutine Eliminate_Extra_Path

MAIN calls ELIMINATE_EXTRA_PATH to loop through the path for each ruler and delete any duplicate points and decrease the total number of points as needed. When this process is repeated for every ruler size, ELIMINATE_EXTRA_PATH returns to MAIN.

Figure 16:
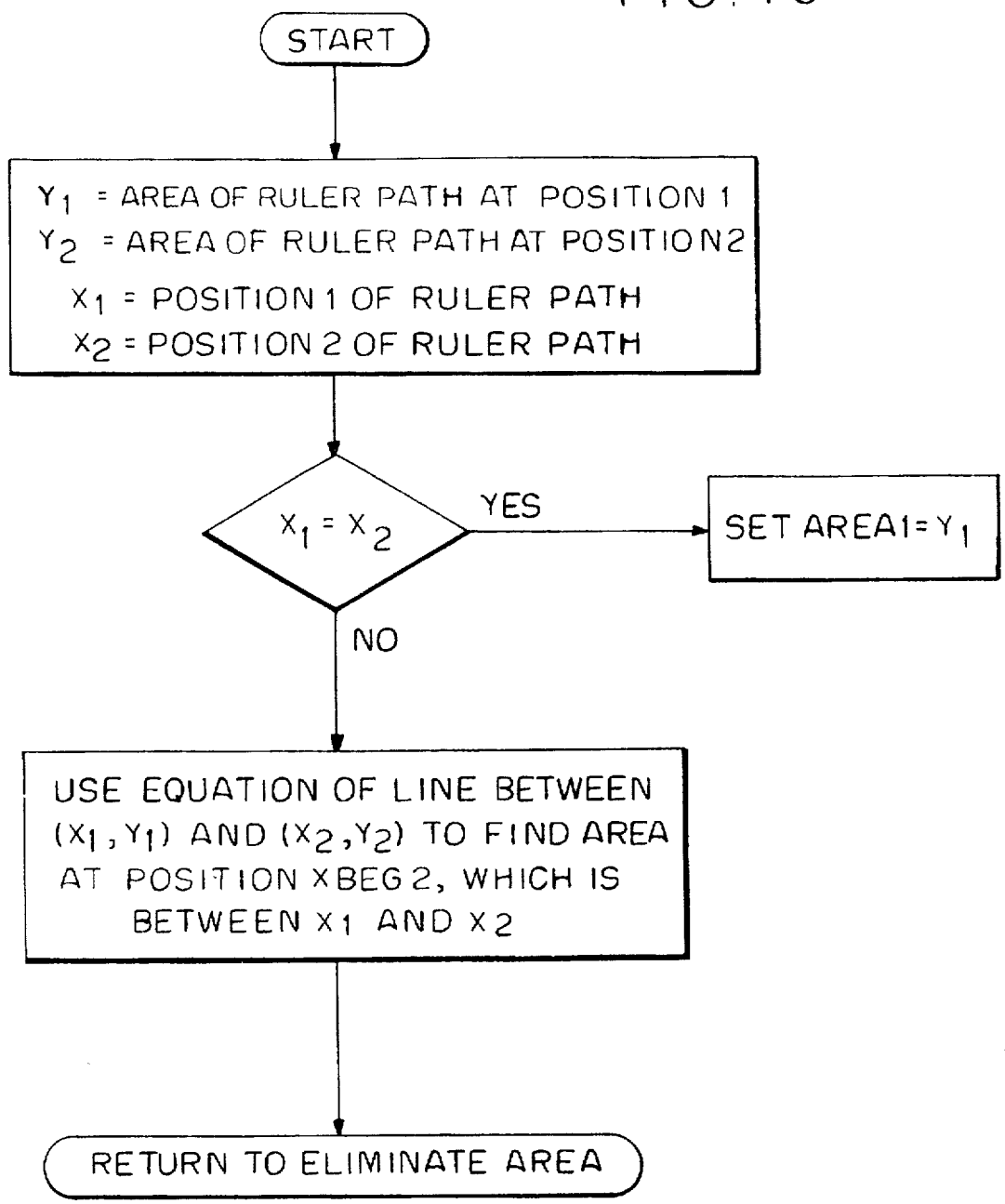

FIG. 16—Subroutine Find_Area1

ELIMINATE_AREA calls FIND_AREA 1 to calculate the area of Ruler1 at a particular x position, call it xbeg1, using the equation of a line and the value of the area of the path of Ruler1 at two points, call them (x1 ,y1) and (x2,y2), where x represents a position value and y represents an area value. First, check to see if these points represent a vertical portion of the area curve, that is, x1–x2. If so, then set Area1 equal to the area at position 1, or Area1=y1. If not, then solve for Area1 using the following formula:

$$Area1 = y1 + s*(xbeg1 - x1)$$

where s is the slope between (x1,y1) and (x2,y2). Once Area1 is calculated, FIND_AREA1 returns to ELIMINATE_AREA.

Figure 17:
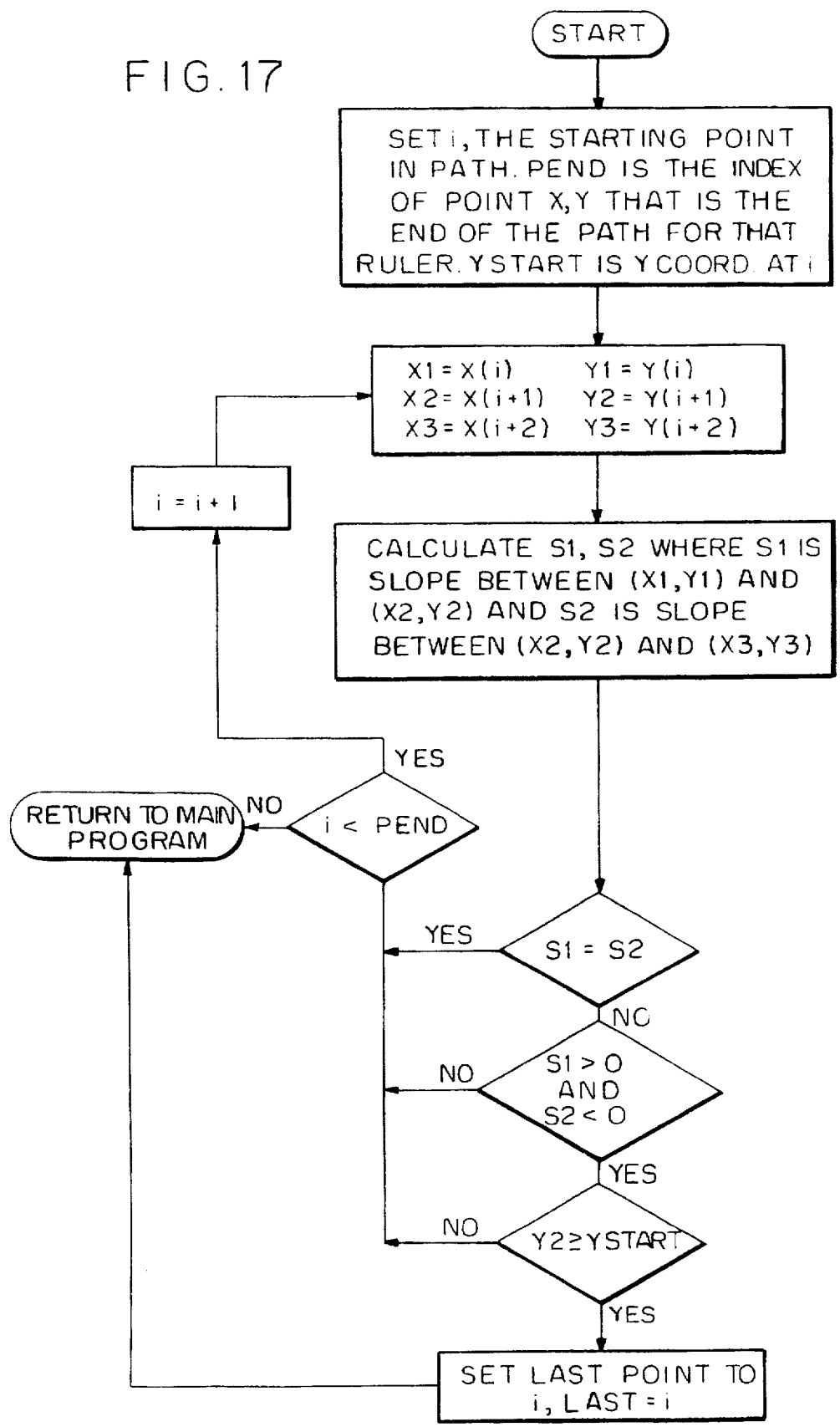

FIG. 17—Subroutine Get_Channel

GET_CHANNEL is called by MAIN to find the endpoints of main voids by identifying the point along the path of given ruler where the slope changes from positive to negative and the y coordinate is greater than or equal to the y coordinate of the first point of the path.

Figure 18:
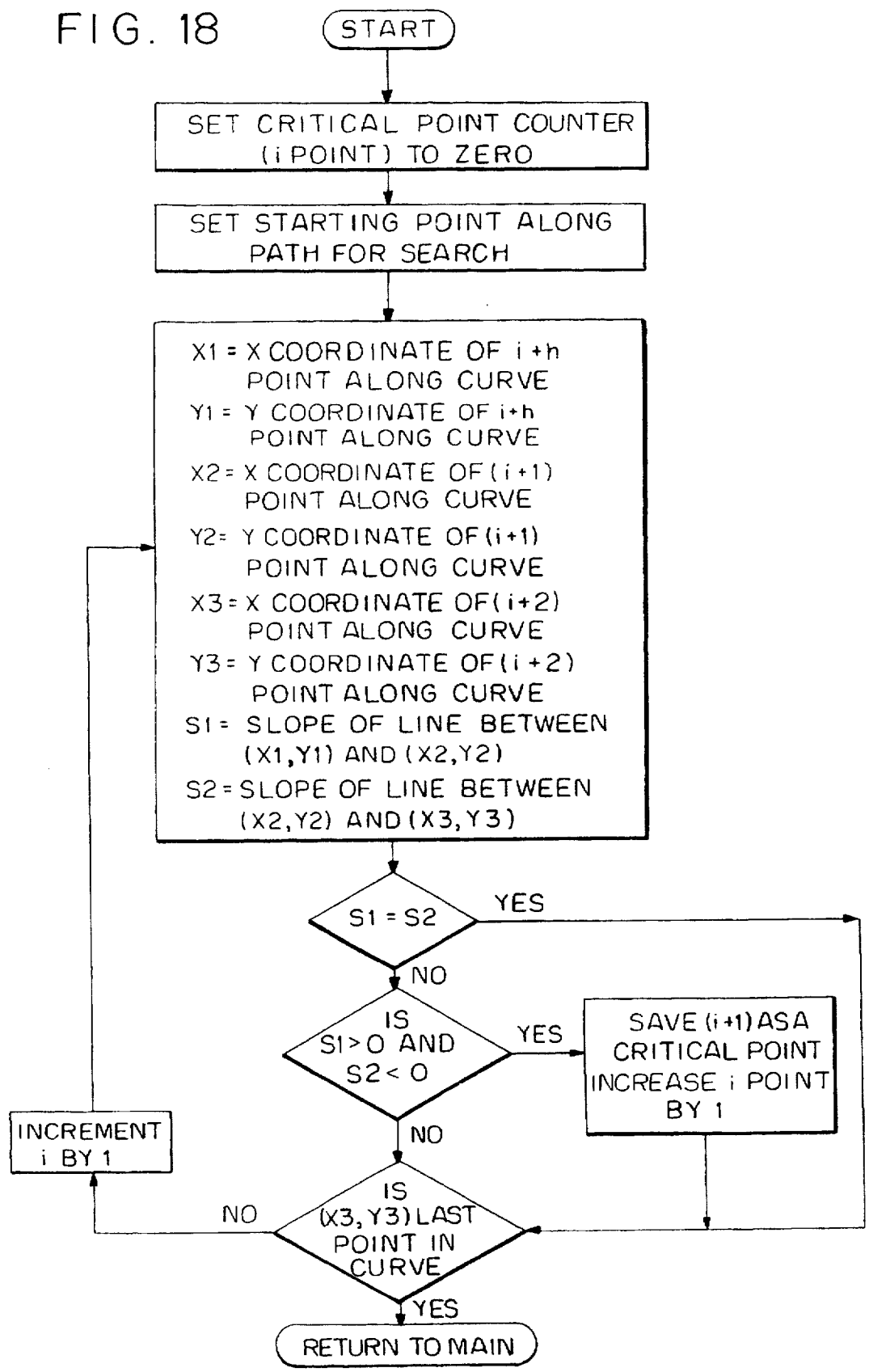

FIG. 18—Subroutine Get_inflection

MAIN calls GET_INFLECTION to identify where nested voids end by finding points along the path curve for a particular ruler where the slope changes from positive to negative. These will be used as stopping points when area is calculated for nested voids.

Figure 19:
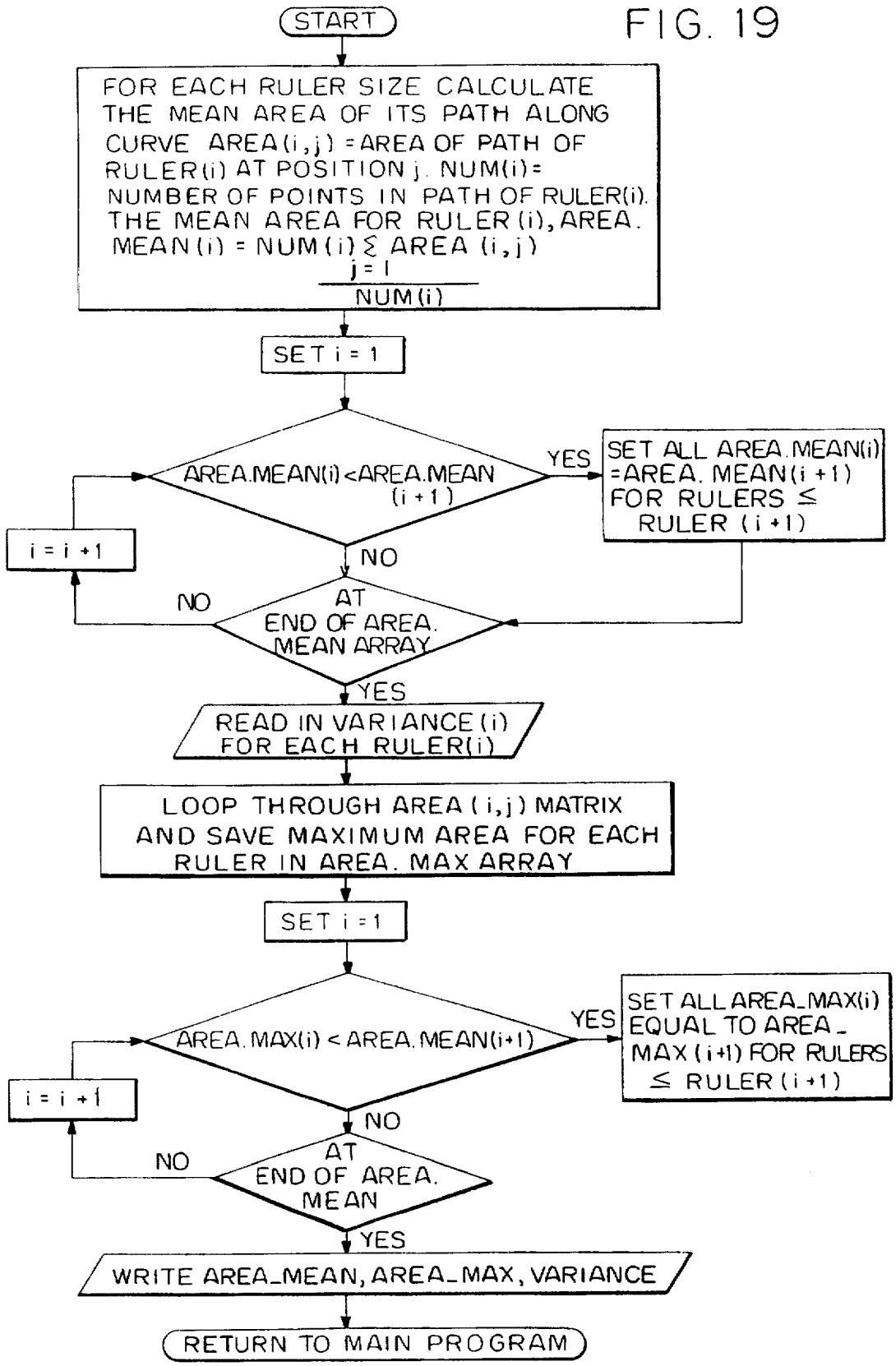

FIG. 19—Subroutine Max_Area

MAX_AREA creates the plotfiles for the maximum area by ruler and mean area by ruler plots. To create the step function of mean area by ruler, it first calculates the mean path area for each ruler by summing the area over each point of the area curve for a particular ruler and dividing by the number of points in the area curve. This step is repeated for each ruler. To create the step function of mean area by ruler, the jumps of the function are identified as those rulers where the slope of the mean area by ruler curve becomes positive. Then between the critical points, or jumps of the function, the mean area value at a particular position is set to the mean area for the greatest ruler less than or equal to the current position. The process is identical for finding the step function for the maximum area by ruler plot except that at first MAX_AREA identifies the greatest area value along the path for each ruler. After writing the points that delineate the step functions, MAX_AREA returns to MAIN.

Figure 20:
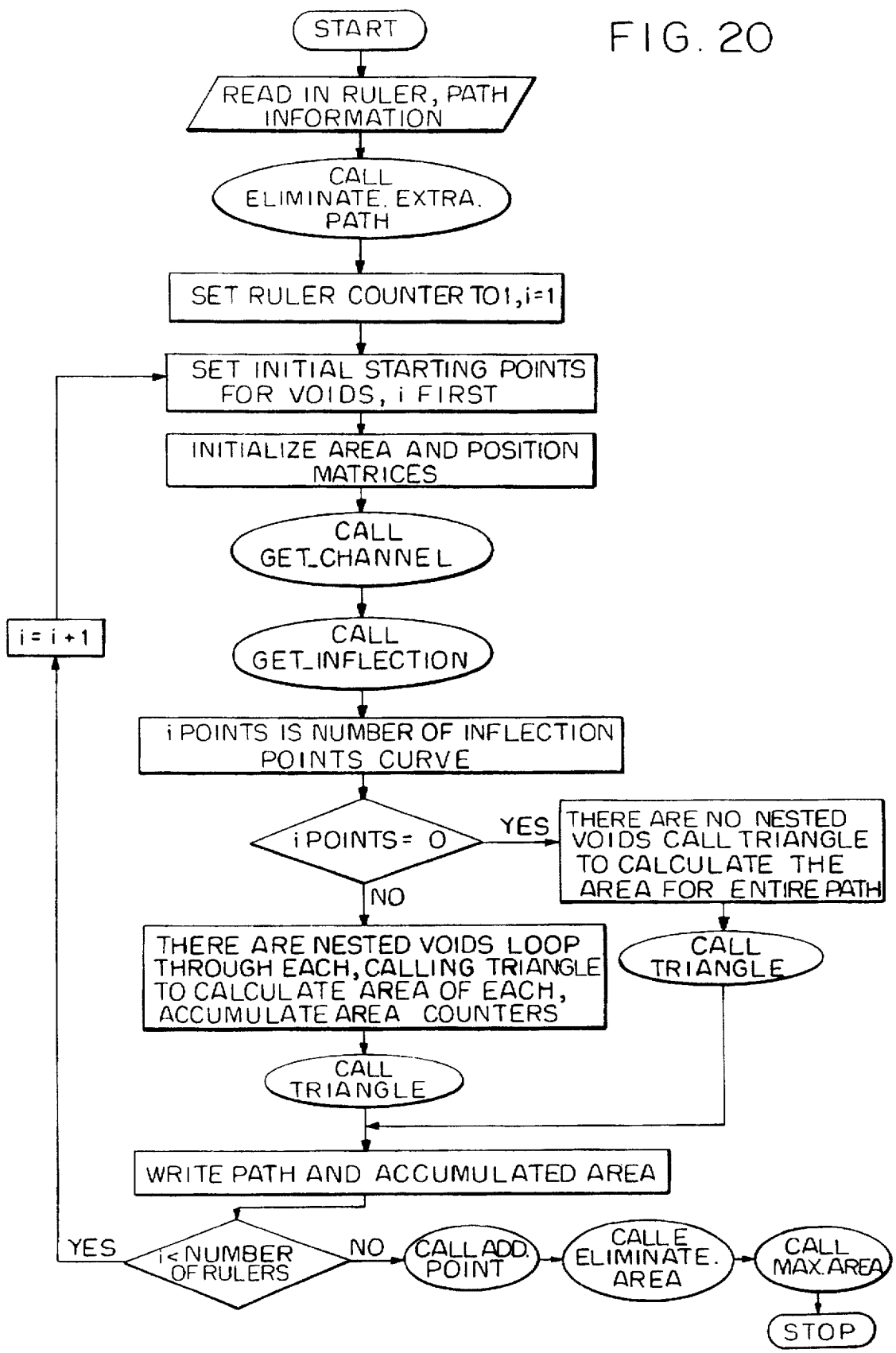

FIG. 20—Main Program

MAIN reads in the coordinate points for the path curve of each ruler and then calls ELIMINATE_EXTRA_PATH to get rid of any duplicate points along a ruler's curve. Then it loops through each ruler size, calling GET_CHANNEL to find the endpoints of main voids along the path curve, GET_INFLECTION to find the endpoints of nested voids within the main voids, and TRIANGLE to compute the area for the main void and nested voids, accumulating the area in two counters, one for cumulative area of the curve, and one for the cumulative area of the void. Note that if there are no nested voids, these values are the same. After MAIN has done this for each of the rulers, then it calls ADD_POINT to interpolate between the points in the area curve for each ruler. Then ELIMINATE_AREA is called to get rid of any duplicate points that were created in the interpolation process. Finally, MAIN calls MAX_AREA to actually create the plotfiles for the maximum area by ruler and mean area for ruler plots.

Figure 21:
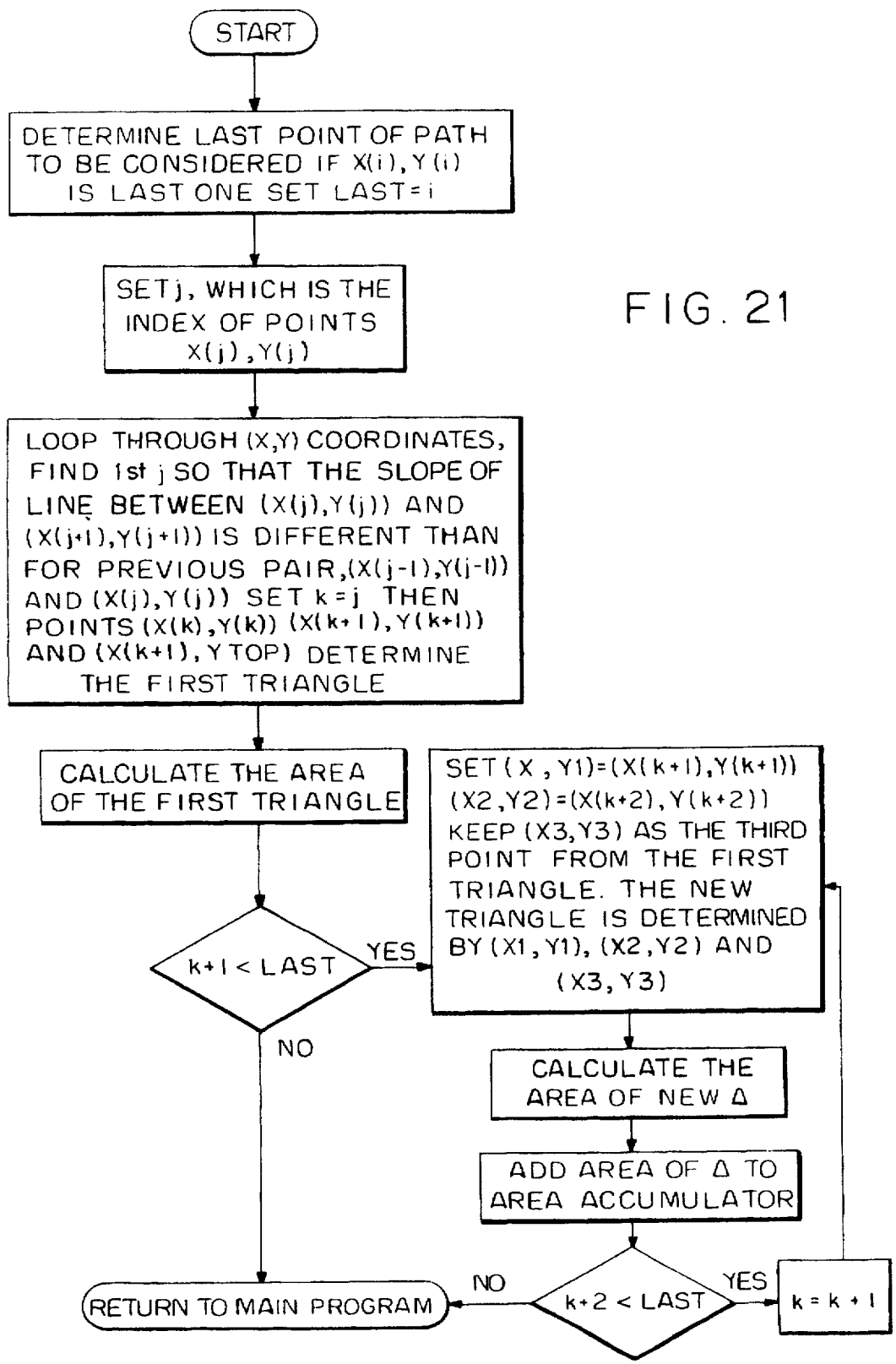

FIG. 21—Subroutine Triangle

TRIANGLE is called by MAIN to compute the area of a section of a ruler path, by triangulating the section as shown in FIG. 11. Notice in FIG. 11, that the main void 100 has been divided into six mutually exclusive triangles 101–106. The upper reference line 100 is the water surface level. TRIANGLE calculates the area via the equation for area of a triangle given in Equation 6. When TRIANGLE has found the area for that section of the path, it returns to MAIN.

Figure 22:
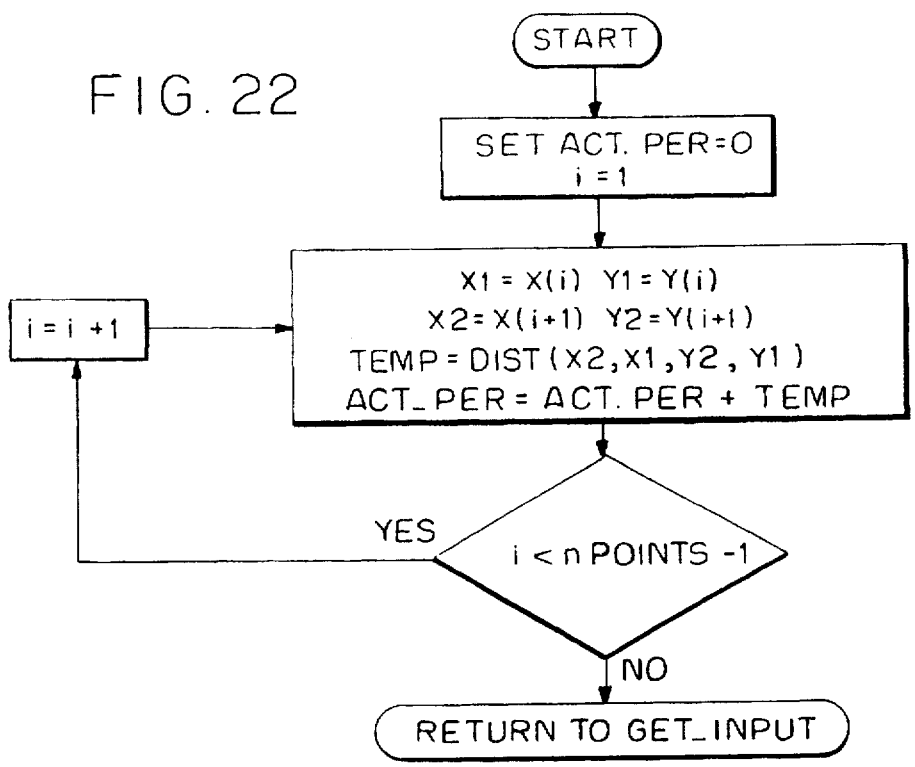

FIG. 22—Subroutine Calc_Per

CALC_PER is called by GET_INPUT to compute the distance between each consecutive pair of points that make up the curve. The sum of the distance between each consecutive pair is the perimeter. To compute distance, Equation 4 is used.

Figure 23:
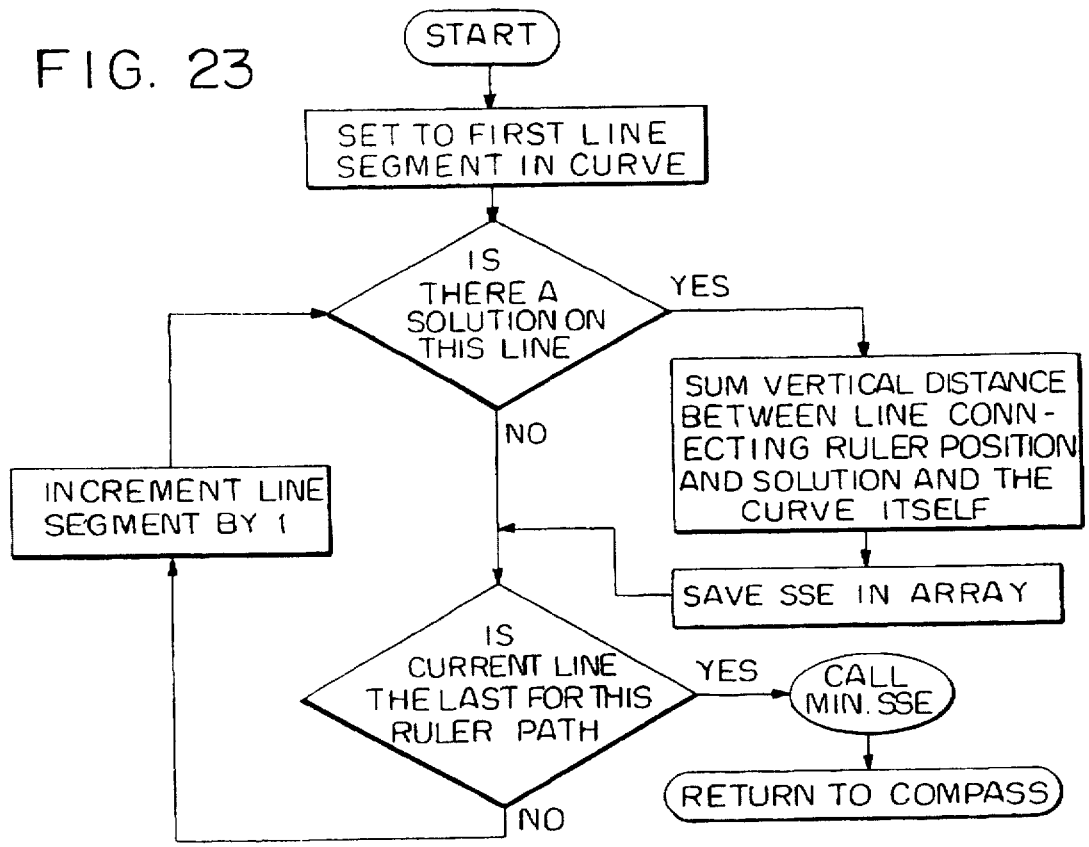

FIG. 23—Subroutine Calc_SSE

CALC_SSE is called by COMPASS to compute the error incurred by choosing any of the possible transect solutions from a given ruler position. The subroutine loops through each line segment of the curve until it finds the one that contains the first proposed solution. Then it finds the SSE for this solution. The sum of squared error is the sum or squared vertical distance from the actual curve to the path the ruler takes from the center to the proposed solution (FIG. 7). This process is repeated for each of the proposed solutions. Then CALC_SSE calls MIN_SSE to identify the solution with the least sum of squared error.

Figure 24:
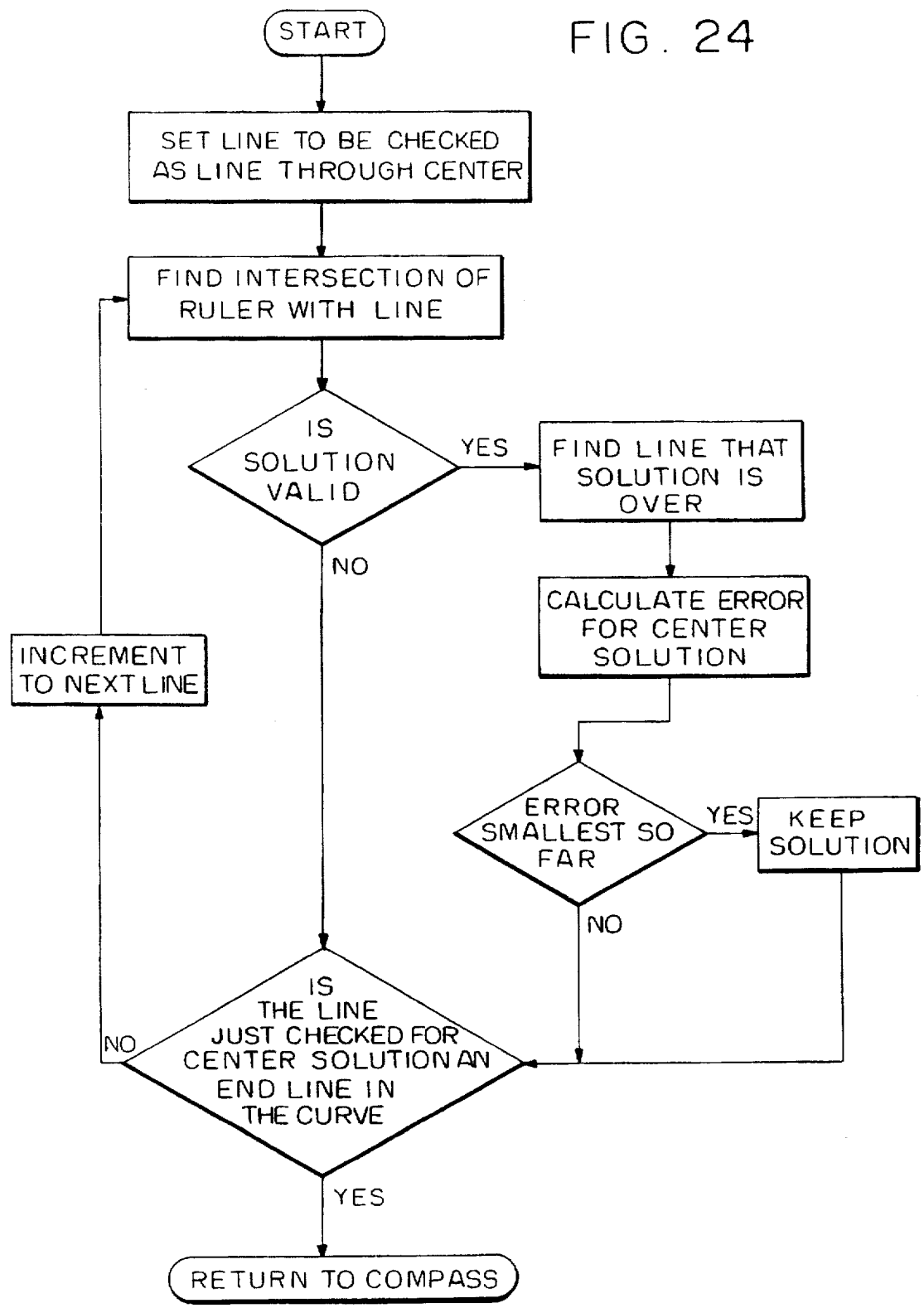

FIG. 24—Subroutine Center

CENTER is called by COMPASS to determine if a solution from the current starting position exists along a line that passes through the endpoints of a line segment of the curve. This solution is called a center solution, and it differs from the transect solution in that it does not represent a point on the curve that the ruler intersected. Please refer to FIG. 10. A center solution is actually above the curve itself. CENTER loops through the line segments that comprise the curve until it reaches one for which a valid center solution exists. A center solution is said to be valid if its coordinates are within the maximum and minimum coordinate values, then CENTER calculates the SSE for the valid solution. As each center solution is identified, its SSE is compared to the SSE for the previous center solution, and the current center solution is kept if its SSE is smaller. So the center solution with the least SSE for that position of the ruler is returned to COMPASS.

Figure 25:
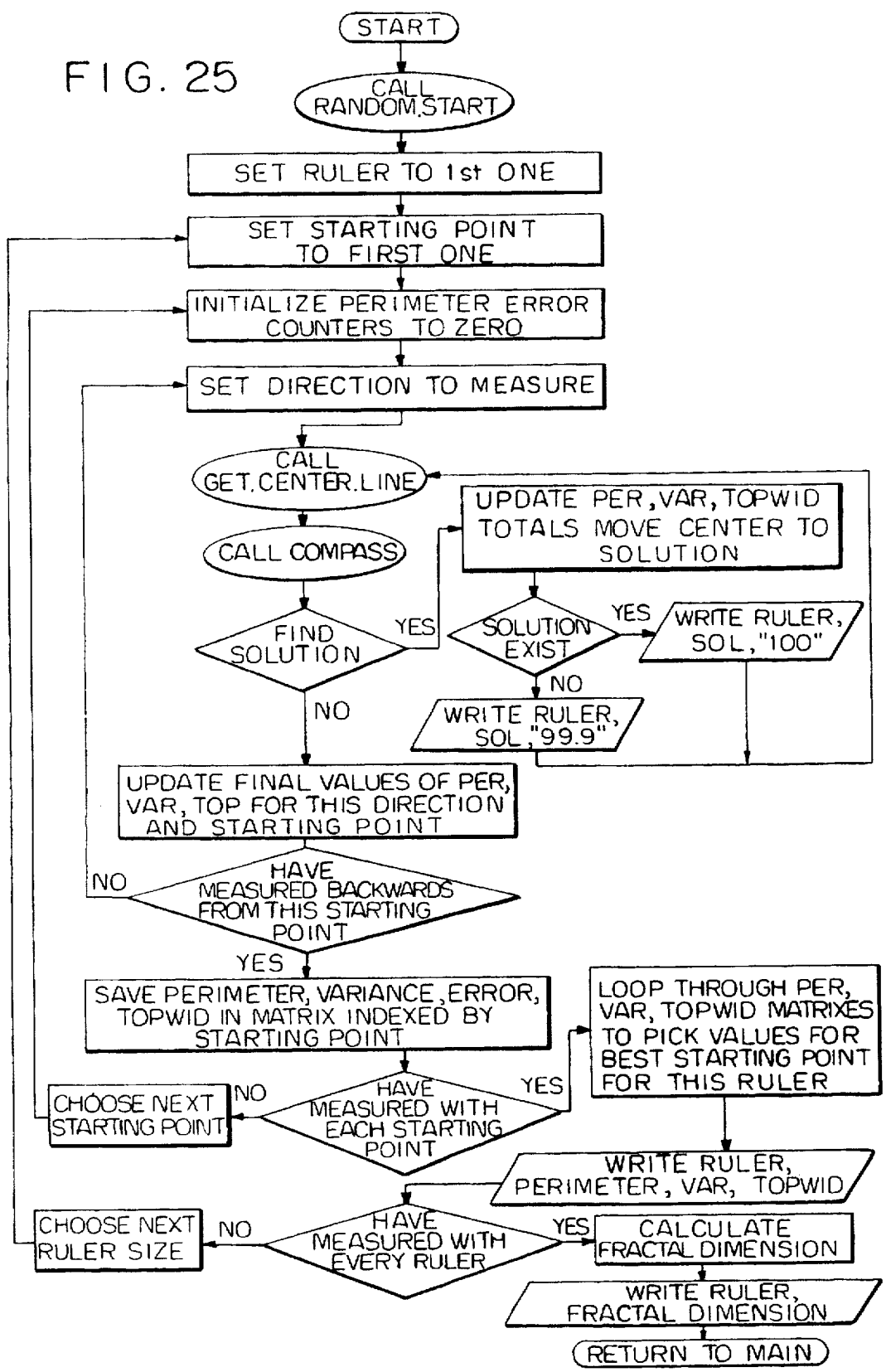

FIG. 25—Subroutine Choose

CHOOSE is the driver for all the computations of MEASURE8.for. If the starting points were not included in the input file, CHOOSE begins by calling RANDOM_START to randomly select the starting points for this transect analysis to be used by each ruler size. The outer loop is over each ruler size. So first, CHOOSE sets the size of the ruler with which to measure the transect. The next loop is over the different possible starting points. So CHOOSE sets the starting position for this ruler size. From this starting point, the ruler will work its way across the curve, first forward to the end, then backward to the beginning, using the same starting point for both directions of measurement.

CHOOSE sets the direction to measure and calls GET_CENTER_LINE to find the line segment on which the ruler is currently positioned. CHOOSE then calls COMPASS to do the search for points where the ruler intersects the transect, or solutions. If COMPASS found a solution, then CHOOSE adds the perimeter, variance, topwidth, and error for this solution to the total for this ruler and this starting position. Topwidth (top, topwld) is the lateral distance tween the center and solution points. The error in this solution is compared to ruler size. If the error is greater than ⅓ the ruler size, then the solution does not exist. Once this is determined, then the appropriate message is written to the output file along with the solution point. The ruler's starting position is moved to the solution point to look for the next solution. If no solution is found, then the final values of perimeter, variance, topwidth, and error for this ruler starting point and direction are saved in an array. If the ruler has not measured the curve backwards from this starting point, CHOOSE sets the measurement direction to backwards and the ruler is positioned at the starting position, and the measurement process is repeated for this direction. Then the perimeter, variance, topwidth, and error totals for this ruler and starting position are saved in a matrix indexed by starting point.

If all the starting points have not been used for this ruler size, then CHOOSE places the ruler at the next point in the starting point array, and goes through the measurement process with this starting point. If all the starting points for this ruler size have been used, then CHOOSE loops through the perimeter and variance matrices to identify the best starting point for this ruler size. The best starting point for a ruler size is one for which the variance is least and perimeter is greatest. Then the perimeter and variance for this best starting point are saved in matrices indexed by ruler size.

If all the ruler sizes have not been used to measure the transect, then CHOOSE sets the ruler size to the next one in the ruler array, and repeats the measuring process. If CHOOSE has used all the ruler sizes, then it calculates the fractal dimension by calculating the negative slope of the line of best fit for the data log(Perimeter) by log(Ruler) CHOOSE outputs this information to a file, and returns to the main program.

Figure 26:
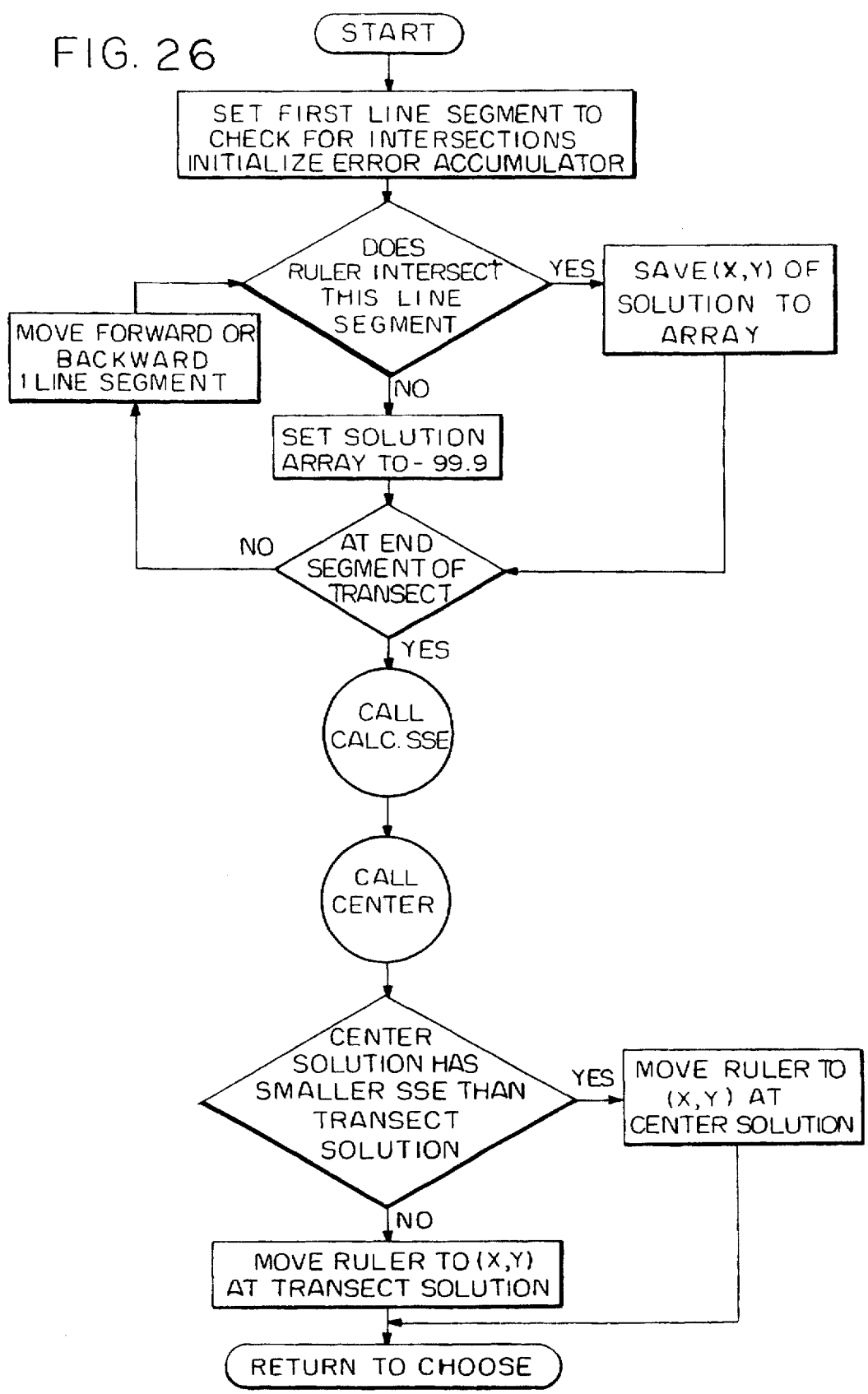

FIG. 26—Subroutine Compass

CHOOSE calls COMPASS to actually find the best solution that a given ruler has with the transect. First, COMPASS loops through each line segment of the transect to see if the ruler intersects this segment from its current position. If it does, then the coordinates of the solution are saved in an array. Then COMPASS goes on to check the next line segment, either forward or backward, depending on the current direction of measurement. Once COMPASS has looped through each line segment of the curve, it calls CALC_SSE to compute the sum of squared error for each of the solution points. Then COMPASS calls CENTER to see if there are any valid center solutions. If so, then the one with the least SSE is compared to the transect solution with the least SSE and of these two solutions, the one with the smaller SSE is chosen. The ruler is repositioned at the solution point and COMPASS returns to CHOOSE.

Figure 27:
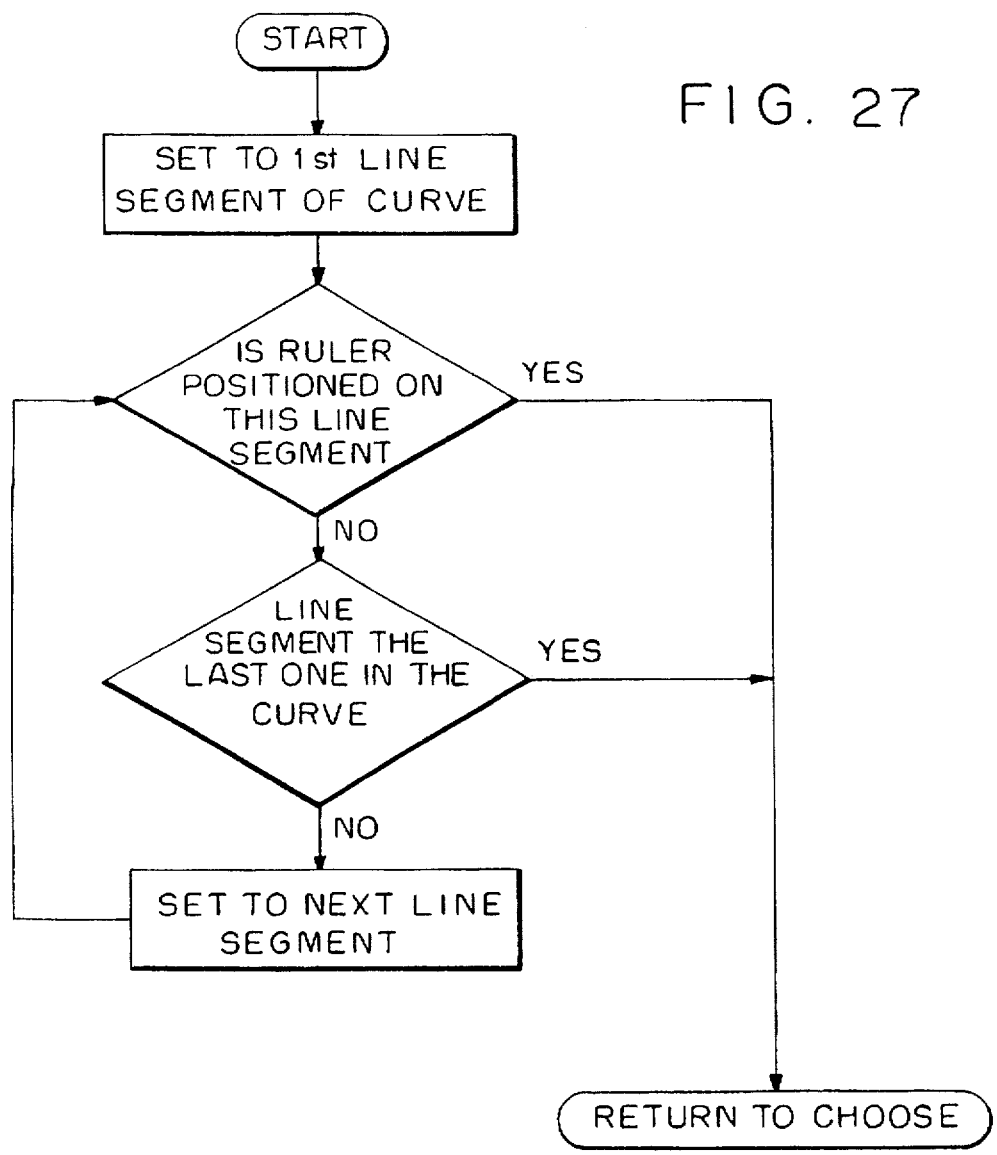

FIG. 27—Subroutine Get_Center_Line

GET_CENTER_LINE loops through the line segments that comprise the curve, checking to see if the ruler is positioned on that line segment. Once this segment is found, GET_CENTER_LINE returns to CHOOSE.

Figure 28:
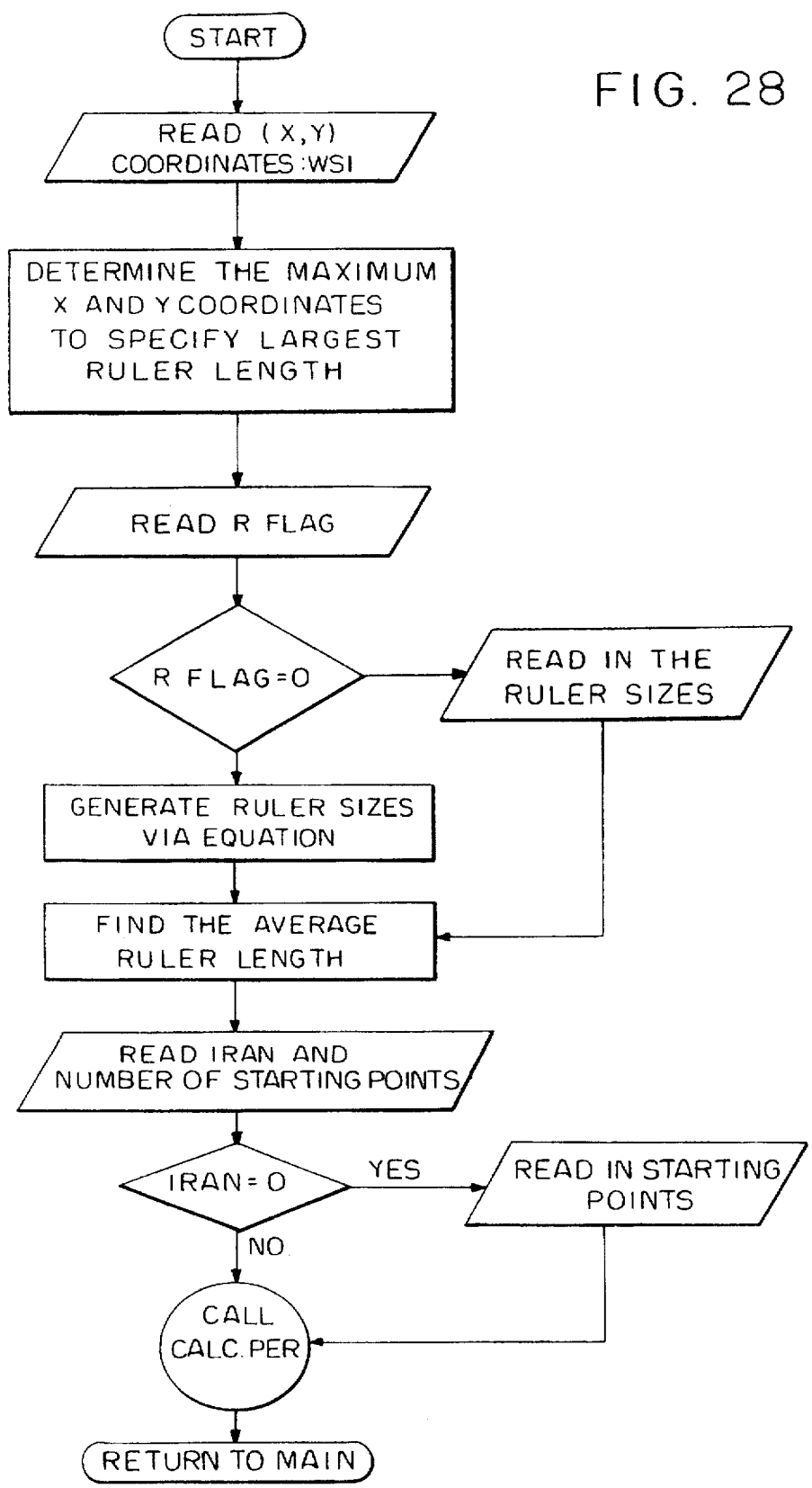

FIG. 28—Subroutine Get_input

GET_INPUT reads in the data from the user-created input files and makes the necessary modifications to prepare the data for analysis. First, GET_INPUT reads in all the points of the curve as (X,Y) coordinates, and finds the maximum and minimum values of X and Y. It also reads in the value of the water surface level, or WSL. These are used to calculate the maximum length and width dimensions of the transect, which determine the largest ruler size to be used. Then the ruler lengths are either computed from Equation 3 or read in from the input file. The average ruler size is computed. The starting positions for the ruler measurement are read in from the input file, if they are not to be generated randomly. CALC_PER finds the perimeter of the curve by summing the lengths of the line segments connecting the points that comprise the curve.

Figure 29:
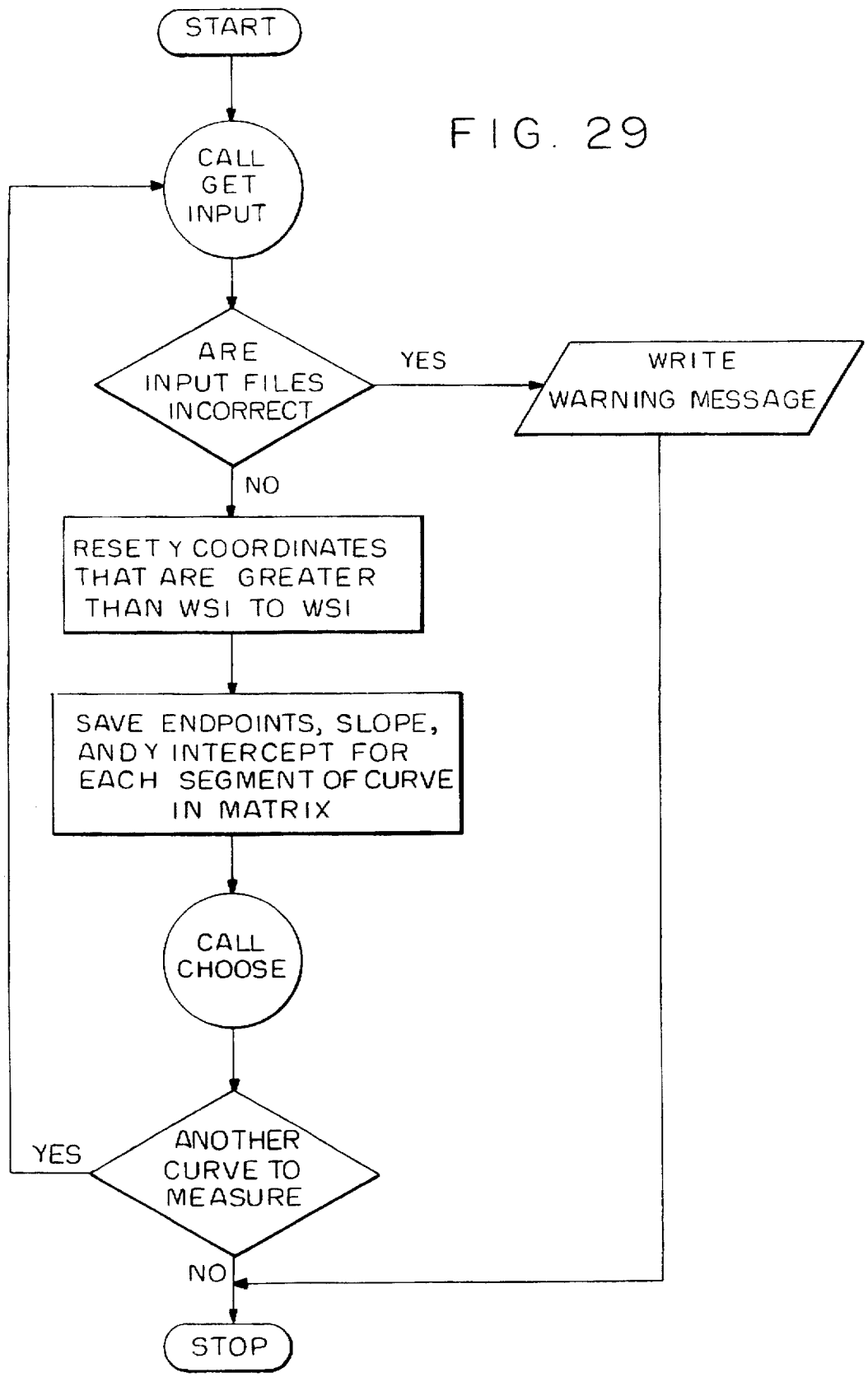

FIG. 29—Main Program

MAIN calls GET_INPUT to read in the necessary user-supplied data about the curve to be analyzed. These files are checked for incorrect values. If any are found then an error message is printed, and the program stops. All points in the curve with Y coordinates greater than WSL are set to WSL. The parameters for the equation of the line segments connecting each consecutive pair of data points, slope, y intercept, and endpoints are saved in a matrix for later use. Main calls CHOOSE which performs all the analysis for a particular curve. If there is another curve to analyze, then the process is repeated, else the program terminates.

Figure 30:
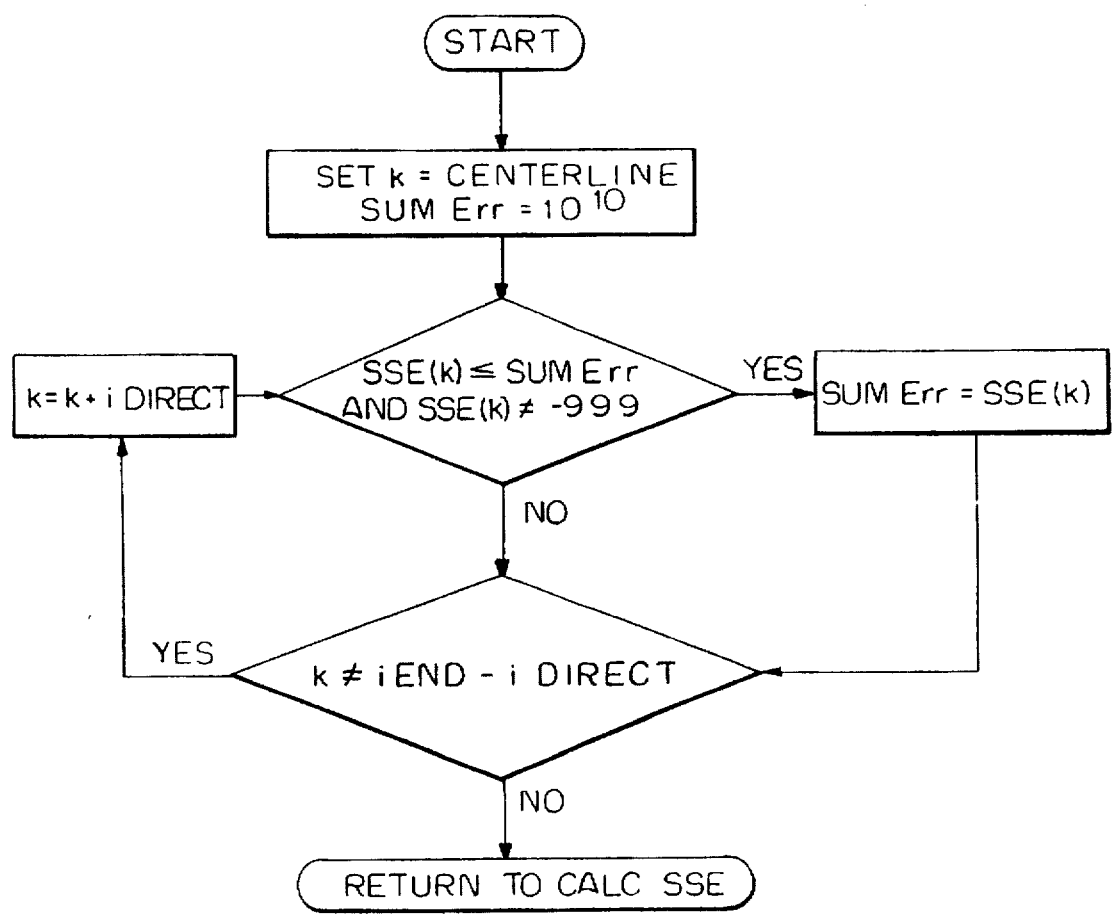

FIG. 30—Subroutine MIN_SSE

MIN_SSE identifies the solution with the least SSE and returns this information to CALC_SSE.

Figure 31:
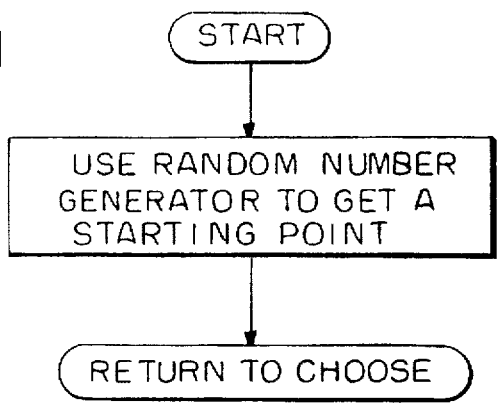

FIG. 31—Subroutine Random_Start

RANDOM_START is called by CHOOSE to select starting positions for the ruler in measuring the curve, unless these are specified in the input data file. The random number generator uses the clock as its seed and generates random numbers between 0 and 1 which are transformed to indices of the X,Y coordinate arrays. The index identifies which (X<Y) points are starting positions for ruler measurement. Then RANDOM_START returns to CHOOSE.

In enhancing the usefulness of the present invention, results of applications to river cross section data, including matching these with fish habitation and hydraulic flow patterns can be published. Moreover, the present invention functions with the process of describing fractal patterns for entire rivers. In addition, the present invention uses several different parameters for calculating fractal dimension and determines which are best for certain applications and certain types of data.

This invention is useful for describing the spatial characteristics of natural and manmade channels. These descriptions can be used for habitat assessments of natural channels and to evaluate artificial channels for their ability to provide spatial habitat characteristics similar to natural channels. This software can also be used to relate estimates of hydraulic conveyance characteristics, such as resistance to river flow (Manning's "n" value) for natural and manmade channels, to transect spatial characteristics. Knowledge of hydraulic conveyance characteristics are important prerequisites for predicting flood water levels and the rate of transport and dispersion of pollutants and hazardous materials in rivers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A computer implemented method for characterizing the spatial aspect of the transect of a river having a right end, a left end and predetermined water surface level, the spatial aspect of the transect of the river is characterized by X-Y points in a Cartesian coordinate system and the water surface level is parallel to a horizontal X axis, the method comprises the steps of:

a) said input data includes dimensional coordinates of the transect; and a set of rulers of different sizes;

b) generating randomly a set of starting points;

c) selecting a ruler having a predetermined size from said set of rulers;

d) initializing perimeter value to zero;

e) initializing Sum of Square value to zero;

f) selecting a starting point from said set of randomly generated starting points; storing said starting point in a storage means;

g) determining a line segment which includes said starting point;

h) calling compass routine to find a next point which fits best on the transect in the direction to the right from said starting point, wherein said compass routine includes an imaginary compass having a radius equaled to said ruler size, said compass having a first end positioned at said starting point, said compass having second end for marking a first point which intersects the transect at a transect solution, said second end also for marking a second point on said line segment at a center solution, said next point is determined by calculating Sum of Squared Error value for said center solution and Sum of Square Error value for said transect solution;

i) selecting either said center solution or said transect solution, which ever has lesser Sum of Squared Error value, to be said next point, wherein said lesser Sum or Squared Error value is accumulated for computing a total Sum of Squared Error value;

j) calculating distance between said starting point and said next point; wherein said distance being accumulated as said ruler traverses the transect to provide a path length from said starting point to the right end of the transect;

k) setting said next point to be a new starting point from which said ruler will continue to traverse the transect; storing said new starting point in said storage means; wherein said new starting point will be used in step g as "said starting point";

l) repeating step g through l until said ruler reaches the right end of the transect;

m) recalling said starting point selected in step f for reuse in step n;

n) determining a line segment which includes said starting point; calling compass routine to find a next point which fits best on the transect in the direction to the left from said starting point, wherein said compass routine includes an imaginary compass having a radius equaled to said ruler size, said compass having a first end positioned at said starting point, said compass having second end for marking a first point which intersect the transect at a transect solution, said second end also for marking a second point on said line segment at a center solution, said next point is determined by calculating Sum of Squared Error value for said center solution and Sum of Square Error value for said transect solution;

o) selecting either said center solution or said transect solution, which ever has lesser Sum of Squared Error value, to be said next point, wherein said lesser Sum or Squared Error value is accumulated for computing a total Sum of Squared Error value;

p) calculating distance between said starting point and said next point; wherein said distance being accumulated as said ruler traverses the transect to provide a path length from said starting point to the left end of the transect;

q) setting said next point to be a new starting point where said ruler will continue to traverse the transect; storing said starting point in said storage means; wherein said new starting point will be used in step n as "said starting point";

r) repeating steps n through r until said ruler reaches the left end of the transect, wherein said accumulated distance as said ruler traverses from said original center point to the right end of the transect and to the left end of the transect represents a total length of the transect measured by said chosen ruler and with said random starting point;

s) storing said ruler, said starting point, said total length of the transect and said total Sum of Squared Error value that are generated for said starting point and said ruler in said storage means, wherein said total length of the transect is a perimeter value;

t) repeating steps d through t until all the starting points in said set of randomly generated starting points have been selected; wherein each repetition of steps d through t creates and stores the points describing the path of the transect in said storage means;

u) repeating steps c through step u until all rulers from said set of rulers are selected; wherein upon the completion of step u, said storage means will have contained, for each ruler size, a set of transect length or perimeter value, Sum of Squared Error and the points describing the path of the transect associated with each starting point in the set of said randomly generated starting points for subsequent processing.

2. The method as recited in claim 1, further comprising the steps of calculating the fractal dimension of the transect by calculating the slope of a plot of perimeter values versus ruler sizes in logarithmic scale.

3. The method recited in claim 1, further includes the step of selecting the perimeter value that has the lowest associated Sum of Square Error value to be the perimeter of the transect.

4. The method of claim 1, further comprises the steps for analyzing the paths that each ruler makes across the transect to determine where maximum ruler area occurs at each different ruler size, utilizing said rulers and said paths of the transect stored in said storage means, wherein the steps include:

a) recalling from said storage means a ruler and a path associated with said ruler that has the least Sum of Squared Error;

b) determining the beginning and the end of main void in said ruler path;

c) finding inflection points within said main voids; wherein said inflection points, if any, reveal nested voids between said beginning and end of said main void d) calculating the area of said main voids, if there is no inflection point found, by dividing each void into triangles and using equation $$AREA_{triangle} = \frac{1}{2} * [X_1 * Y_2 + X_2 * Y_3 + X_3 * Y_1 - Y_1 * Y_2 - Y_2 * Y_3 - Y_3 * X_1];$$

e) calculating area for each of the founded nested voids utilizing said equation found in step d and recording each of said areas and its corresponding horizontal position in the transect, wherein said horizontal position is the X coordinate where the center point of each area is located, said horizontal position is used as a marker where each area of the nested voids is located, the marker is used for future comparison of the same area calculated by different ruler sizes in step g;

f) recalling another ruler and path from said storage and repeating steps b through f until there all the rulers and associated paths in said storage means are processed;

g) verifying the authenticity of the calculated area values at each horizontal position for each ruler; wherein if a large ruler shows greater area at a given horizontal position than that of a smaller value, this would indicate that the larger ruler is attempting to fit the transect;

h) resetting the area calculated using the larger ruler to that of the smaller ruler if the if the larger ruler is attempting to fit the transect as verified in step g;

i) calculating average area value and maximum area value for each ruler;

j) displaying graphically user-selected data generated by aforementioned steps.

5. A computer software on a computer-readable medium, the software includes a method of characterizing the spatial aspect of the transect of a river having a right end, a left end and predetermined water surface level, the spatial aspect of the transect of the river is characterized by X-Y coordinate points in a Cartesian coordinate system and the water said input data includes;

a) getting user-input data, said input data include: a set of samples of two dimensional coordinates of the transect; and a set of rulers of different sizes;

b) generating randomly a set of starting points;

c) selecting a ruler having a predetermined size from said set of rulers;

d) initializing perimeter value to zero;

e) initializing Sum of Square value to zero;

f) selecting a starting point from said set of randomly generated starting points; storing said starting point in a storage means;

g) determining a line segment which includes said starting point;

h) calling compass routine to find a next point which fits best on the transect in the direction to the right from said starting point, wherein said compass routine includes an imaginary compass having a radius equaled to said ruler size, said compass having a first end positioned at said starting point, said compass having second end for marking a first point which intersects the transect at a transect solution, said second end also for marking a second point on said line segment at a center solution, said next point is determined by calculating Sum of Squared Error value for said center solution and Sum of Square Error value for said transect solution;

i) selecting either said center solution or said transect solution, which ever has lesser Sum of Squared Error value, to be said next point, wherein said lesser Sum or Squared Error value is accumulated for computing a total Sum of Squared Error value;

j) calculating distance between said starting point and said next point; wherein said distance being accumulated as said ruler traverses the transect to provide a path length from said starting point to the right end of the transect;

k) setting said next point to be a new starting point from which said ruler will continue to traverse the transect; storing said new starting point in said storage means; wherein said new starting point will be used in step g as "said starting point";

l) repeating step g through l until said ruler reaches the right end of the transect;

m) recalling said starting point selected in step f for reuse in step n;

n) determining a line segment which includes said starting point; calling compass routine to find a next point which fits best on the transect in the direction to the left from said starting point, wherein said compass routine includes an imaginary compass having a radius equaled to said ruler size, said compass having a first end positioned at said starting point, said compass having second end for marking a first point which intersect the transect at a transect solution, said second end also for marking a second point on said line segment at a center solution, said next point is determined by calculating Sum of Squared Error value for said center solution and Sum of Square Error value for said transect solution;

o) selecting either said center solution or said transect solution, which ever has lesser Sum of Squared Error value, to be said next point, wherein said lesser Sum or Squared Error value is accumulated for computing a total Sum of Squared Error value;

p) calculating distance between said starting point and said next point; wherein said distance being accumulated as said ruler traverses the transect to provide a path length from said starting point to the left end of the transect;

q) setting said next point to be a new starting point where said ruler will continue to traverse the transect; storing said starting point in said storage means; wherein said new starting point will be used in step n as "said starting point";

r) repeating steps n through r until said ruler reaches the left end of the transect, wherein said accumulated distance as said ruler traverses from said original center point to the right end of the transect and to the left end of the transect represents a total length of the transect measured by said chosen ruler and with said random starting point;

s) storing said ruler, said starting point, said total length of the transect and said total Sum of Squared Error value that are generated for said starting point and said ruler in said storage means, wherein said total length of the transect is a perimeter value;

t) repeating steps d through t until all the starting points in said set of randomly generated starting points have been selected; wherein each repetition of steps d through t creates and stores the points describing the path of the transect in said storage means;

u) repeating steps c through step u until all rulers from said set of rulers are selected; wherein upon the completion of step u, said storage means will have contained, for each ruler size, a set of transect length or perimeter value, Sum of Squared Error and the points describing the path of the transect associated with each starting point in the set of said randomly generated starting points for subsequent processing.

6. The method of claim 5, further comprises the steps for analyzing the paths that each ruler makes across the transect to determine where maximum ruler area occurs at each different ruler size, utilizing said rulers and said paths of the transect stored in said storage means, wherein the steps include:

a) recalling from said storage means a ruler and a path associated with said ruler that has the least Sum of Squared Error;

b) determining the beginning and the end of main void in said ruler path;

c) finding inflection points within said main voids; wherein said inflection points, if any, reveal nested voids between said beginning and end of said main void d) calculating the area of said main voids, if there is no inflection point found, by dividing each void into triangles and using equation $$AREA_{triangle} = \tfrac{1}{2} * [X_1*Y_2 + X_2*Y_3 + X_3*Y_1 - Y_1*Y_2 - Y_2*Y_3 - Y_3*X_1];$$

e) calculating area for each of the founded nested voids utilizing said equation found in step d and recording each of said areas and its corresponding horizontal position in the transect, wherein said horizontal position is the X coordinate where the center point of each area is located, said horizontal position is used as a marker where each area of the nested voids is located, the marker is used for future comparison of the same area calculated by different ruler sizes in step g;

f) recalling another ruler and path from said storage and repeating steps b through f until there all the rulers and associated paths in said storage means are processed;

g) verifying the authenticity of the calculated area values at each horizontal position for each ruler; wherein if a large ruler shows greater area at a given horizontal position than that of a smaller value, this would indicate that the larger ruler is attempting to fit the transect;

h) resetting the area calculated using the larger ruler to that of the smaller ruler if the larger ruler is attempting to fit the transect as verified in step g;

i) calculating average area value and maximum area value for each ruler;

j) displaying graphically user-selected data generated by aforementioned steps.

* * * * *